US012434172B2

(12) United States Patent
Godfrey et al.

(10) Patent No.: US 12,434,172 B2
(45) Date of Patent: Oct. 7, 2025

(54) METHODS AND SYSTEMS FOR MANAGING FLUID FLOW IN CONTAINERS

(71) Applicant: The USA, as represented by the Secretary, Department of Health and Human Services, Bethesda, MD (US)

(72) Inventors: Alexander Glenn Godfrey, Carmel, IN (US); Pranav Bende, University Park, MD (US); Linus Eric Wallgren, Chevy Chase, MD (US); David Calabrese, Germantown, MD (US)

(73) Assignee: THE USA, AS REPRESENTED BY THE SECRETARY, DEPT. OF HEALTH AND HUMAN SERVICES, Bethesda, MD (US)

( * ) Notice: Subject to any disclaimer, the term of this patent is extended or adjusted under 35 U.S.C. 154(b) by 0 days.

(21) Appl. No.: 18/044,179

(22) PCT Filed: Sep. 22, 2021

(86) PCT No.: PCT/US2021/051525
§ 371 (c)(1),
(2) Date: Mar. 6, 2023

(87) PCT Pub. No.: WO2022/066748
PCT Pub. Date: Mar. 31, 2022

(65) Prior Publication Data
US 2023/0311022 A1  Oct. 5, 2023

Related U.S. Application Data

(60) Provisional application No. 63/081,723, filed on Sep. 22, 2020.

(51) Int. Cl.
*B01D 1/30* (2006.01)
*B01D 3/34* (2006.01)
*B01L 3/00* (2006.01)

(52) U.S. Cl.
CPC ............... *B01D 3/346* (2013.01); *B01D 1/30* (2013.01); *B01L 3/56* (2013.01); *B01L 3/563* (2013.01); *B01L 3/50825* (2013.01)

(58) Field of Classification Search
CPC ...... B01L 3/56–569; B01L 9/06; B01L 9/065; B65D 51/1611
See application file for complete search history.

(56) References Cited

U.S. PATENT DOCUMENTS

| | | | | |
|---|---|---|---|---|
| 3,398,935 A | * | 8/1968 | Livesey | B01F 33/407 |
| | | | | 261/119.1 |
| 4,600,473 A | * | 7/1986 | Friswell | B01D 1/14 |
| | | | | 422/255 |

(Continued)

FOREIGN PATENT DOCUMENTS

| | | |
|---|---|---|
| JP | 2007-520743 | 7/2007 |
| JP | 2010-539562 | 12/2010 |

(Continued)

OTHER PUBLICATIONS

Espacenet Translation of JP 2014222148 A.*

(Continued)

*Primary Examiner* — Jonathan Luke Pilcher
(74) *Attorney, Agent, or Firm* — Sheridan Ross P.C.

(57) ABSTRACT

Systems and methods for managing fluid flow in and evaporating solvents from containers are provided. In various embodiments, systems of the present disclosure provide for cap or cover members operable to be provided with vials or containers comprising one or more fluids. The caps are further operable to direct air and gas flow into and out of the containers. In some embodiments, supporting structures and heating elements are provided to enhance and assist various processes.

18 Claims, 33 Drawing Sheets

(56) References Cited

U.S. PATENT DOCUMENTS

| | | | |
|---|---|---|---|
| 4,707,452 A | * 11/1987 | Friswell | ............ B01D 1/14 |
| | | | 422/547 |
| 2007/0109438 A1 | 5/2007 | Duparre et al. | |
| 2010/0012278 A1 | * 1/2010 | Ohnuki | ......... B01L 3/50825 |
| | | | 159/16.1 |
| 2011/0134040 A1 | 6/2011 | Duparre et al. | |
| 2011/0279727 A1 | 11/2011 | Kusaka | |
| 2017/0104942 A1 | 4/2017 | Hirota et al. | |
| 2020/0116559 A1 | 4/2020 | Pacala et al. | |

FOREIGN PATENT DOCUMENTS

| | | | | |
|---|---|---|---|---|
| JP | 2011-176715 | | 9/2011 | |
| JP | 5488928 | | 5/2014 | |
| JP | 2014222148 A | * | 11/2014 | ......... B01D 1/22 |
| JP | 2015-201834 | | 11/2015 | |

OTHER PUBLICATIONS

International Search Report prepared by the European Patent Office on Apr. 25, 2022, for International Application No. PCT/US2021/051525, 8 pgs.

Written Opinion prepared by the European Patent Office on Apr. 25, 2022, for International Application No. PCT/US2021/051525, 13 pgs.

International Preliminary Report on Patentability for International (PCT) Patent Application No. PCT/US2021/051525, dated Apr. 6, 2023, 14 pages.

* cited by examiner

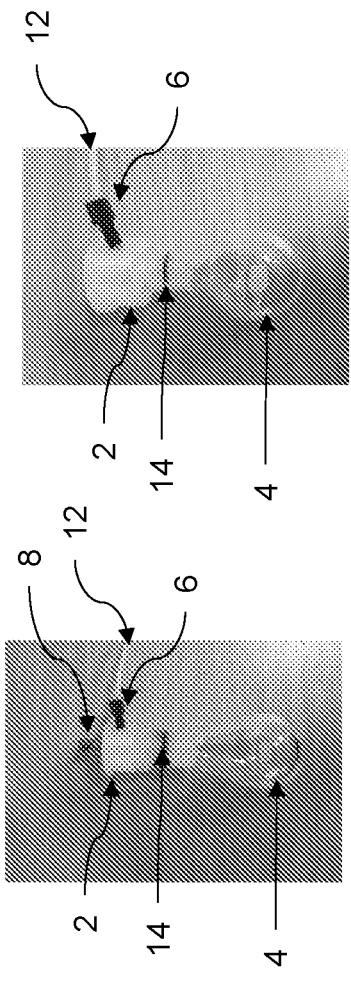
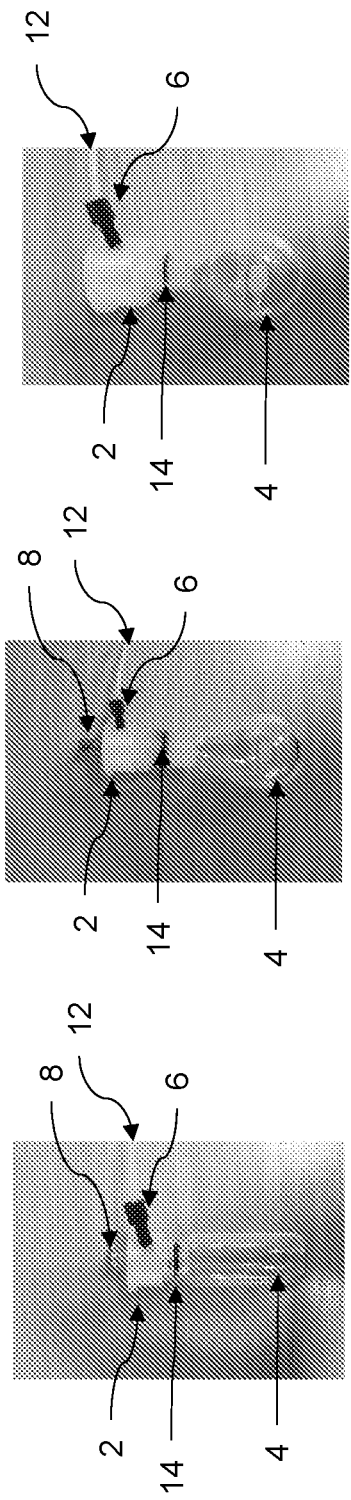
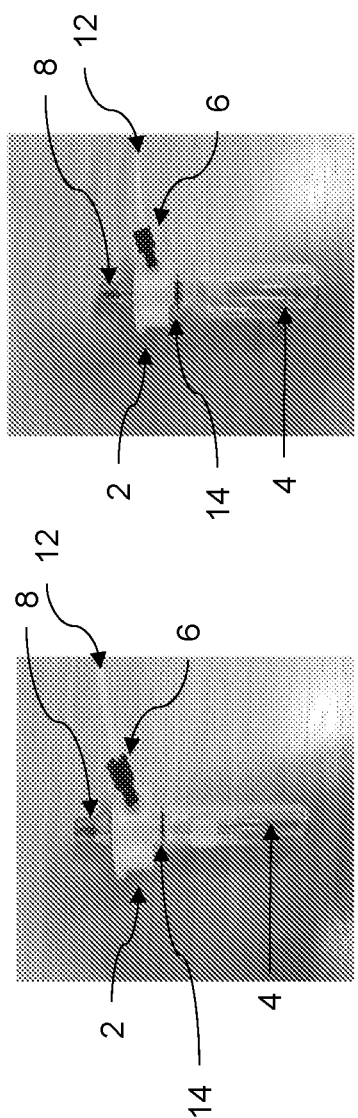
Fig. 2A
Fig. 2B
Fig. 2C
Fig. 2D
Fig. 2E

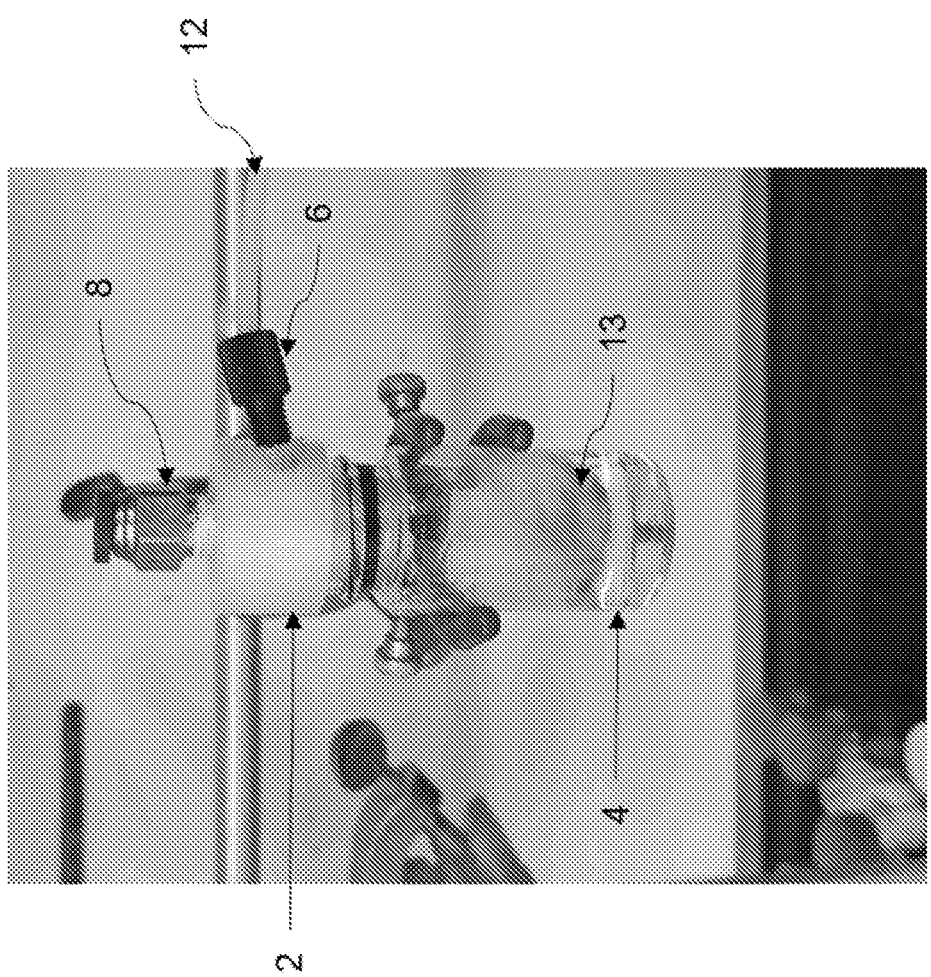

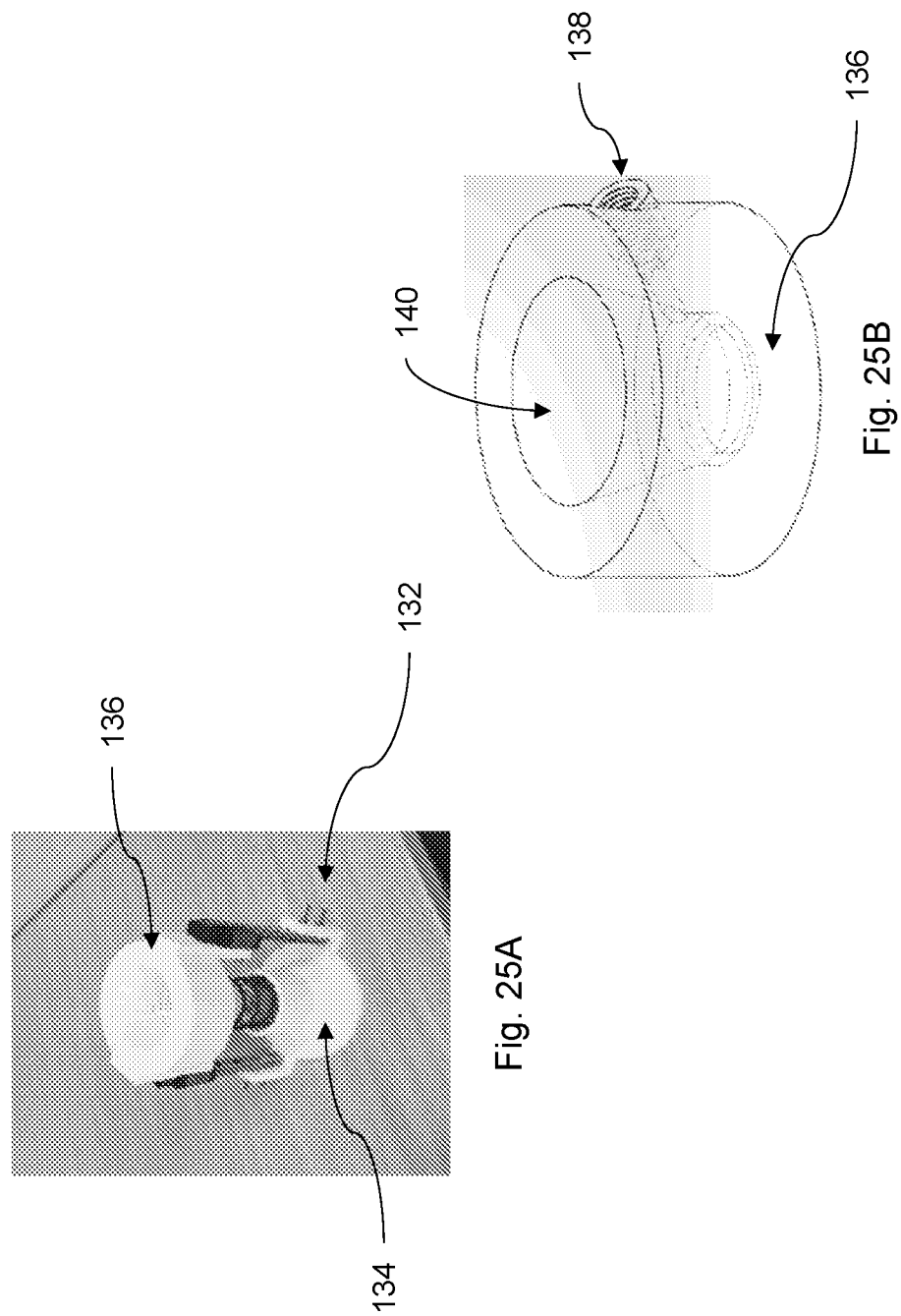

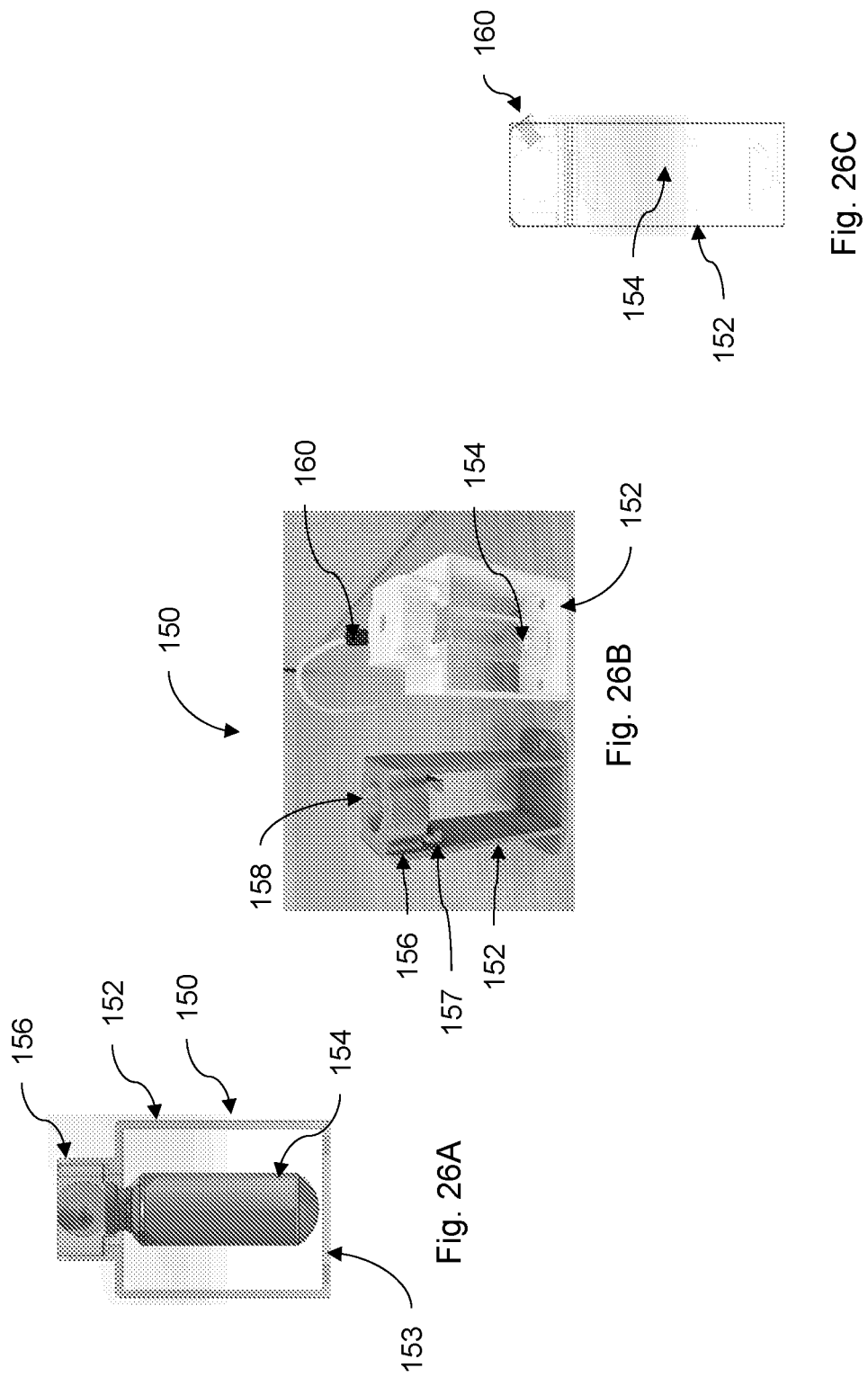

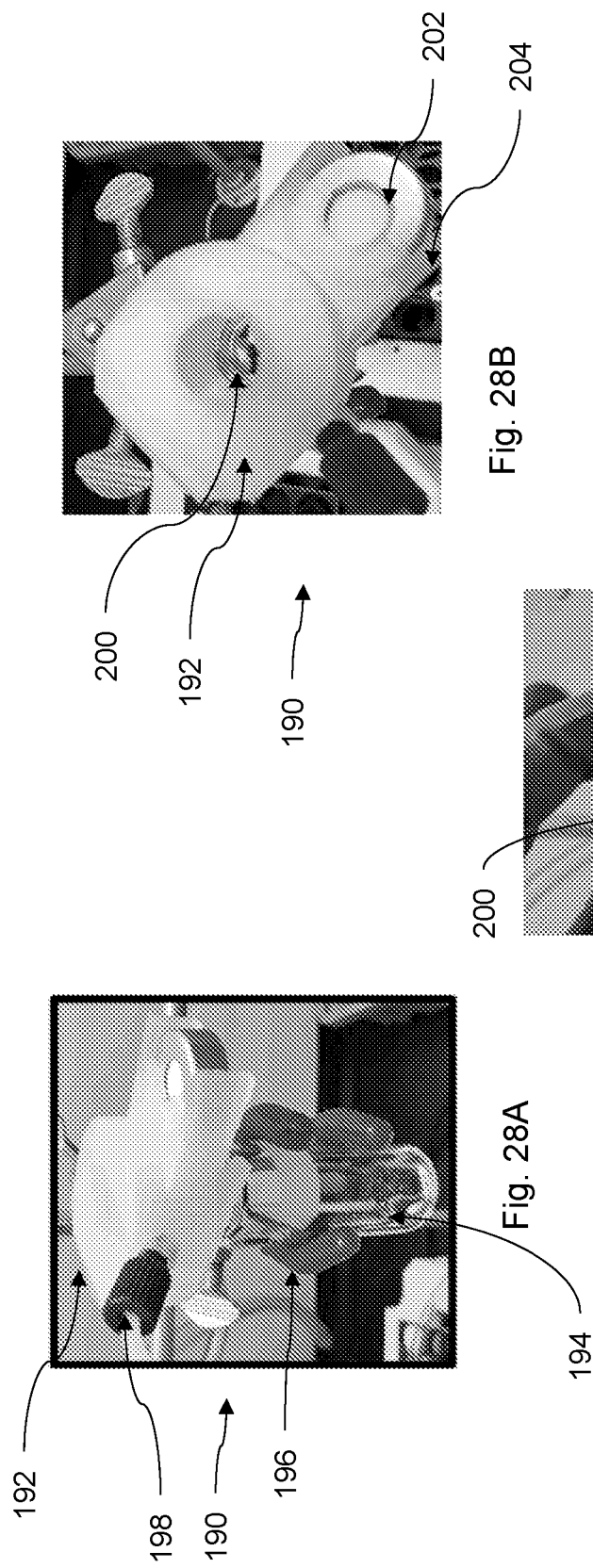
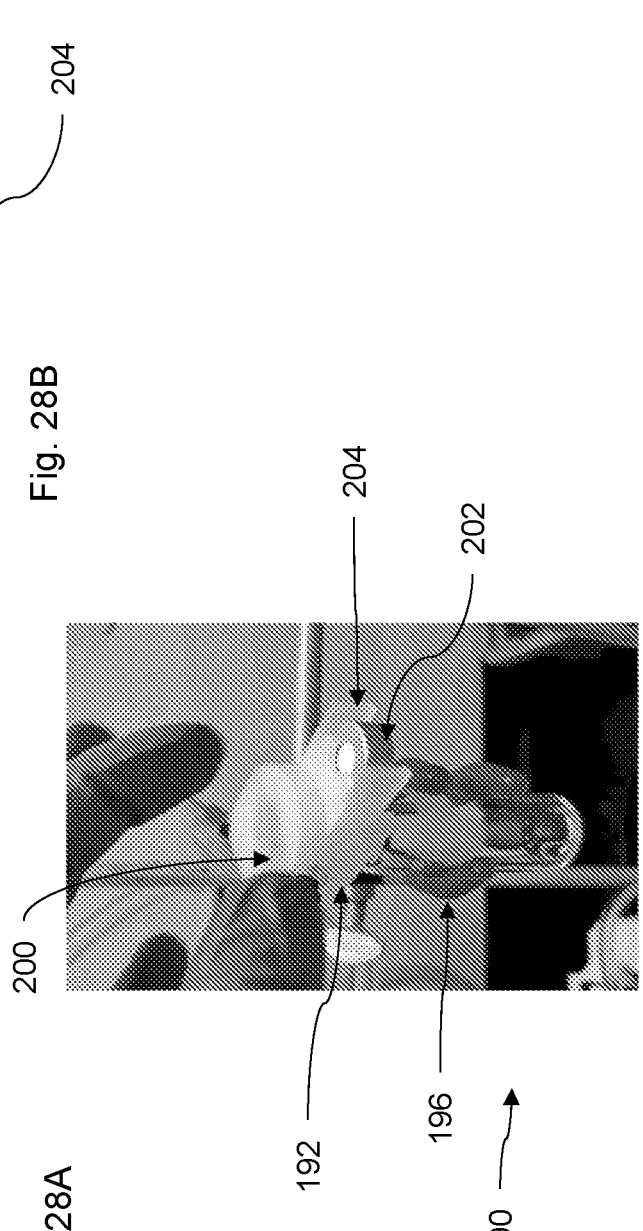
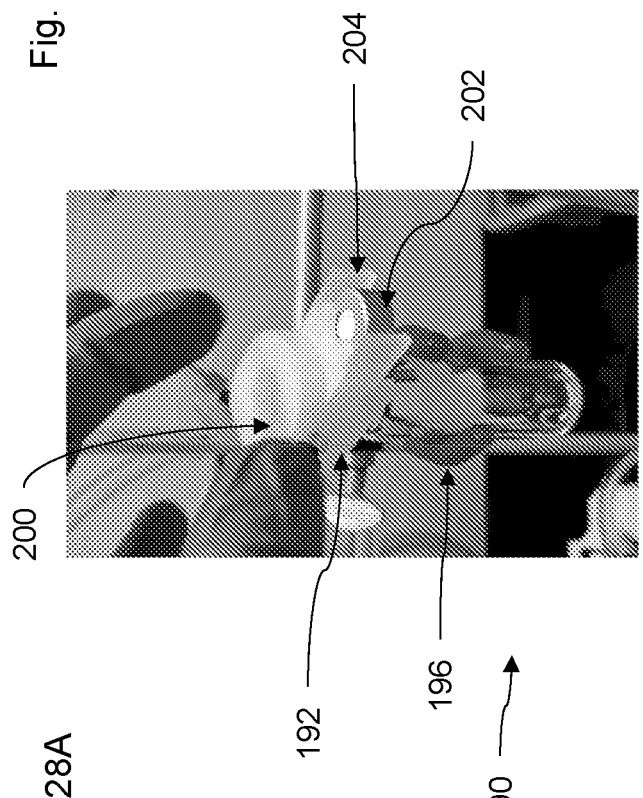
Fig. 28A
Fig. 28B
Fig. 28C

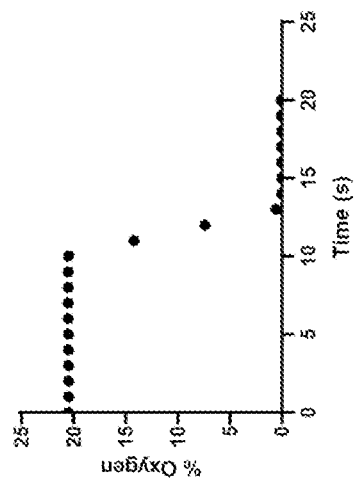

METHODS AND SYSTEMS FOR MANAGING FLUID FLOW IN CONTAINERS

CROSS-REFERENCE TO RELATED APPLICATIONS

This application is a national stage application under 35 U.S.C. 371 and claims the benefit of PCT Application No. PCT/US2021/051525, having an international filing date of 22 Sep. 2021, which designated the European Patent Office, which PCT application claimed the benefit of priority of U.S. Provisional Patent Application Ser. No. 63/081,723, filed Sep. 22, 2020, the entire disclosure of which is hereby incorporated by reference.

GOVERNMENT RIGHTS

The Government of the United States has certain rights in this invention.

FIELD

The present disclosure relates generally to methods, systems and devices for use in managing air-flow and contents of containers in evaporative processes and various benchtop processes and reactions. In some embodiments, evaporator lids, covers, closures and caps are provided that are operable to be provided with various vials and similar equipment. The lids, covers, closure and/or caps are operable to receive and direct a fluid flow and facilitate the evaporation of contents within a container and sweep or clear a headspace of a container. In some embodiments, heating and thermal energy systems are provided.

BACKGROUND

The use of forced gas (typically air or nitrogen) streams to accelerate the evaporation of solvents in the laboratory setting are fairly commonplace. However, the efficiency and design such systems can vary greatly.

Various methods, systems and devices for providing and enhancing evaporative processes are known. For example, U.S. Pat. No. 5,897,838 to Kempe, which is hereby incorporated by reference in its entirety, discloses a device for directing air flow and pressure to and from a solution in a container to aid evaporative processes. Kempe fails to disclose, however, various features, methods and systems of the present disclosure as will be shown and described herein.

SUMMARY

There has been a long-felt but unmet need to provide improved methods and systems for removal of solvents and gases during various processes. There has further been a need to provide a system that comprises a support and base member that is operable to accommodate containers during various operations, and a need to reliably and efficiently provide thermal energy to such containers.

It is an object of embodiments of the present disclosure to produce a shearing effect on a vapor gradient that forms as an equilibrium phenomenon at the surface of a liquid. The shearing effect removes the vapor layer, thus driving equilibrium to produce more vapor which accelerates an evaporative process. In some embodiments, processes are optimized by introducing a gas stream at an angle as close to parallel to a surface of the liquid as possible. Processes are also optimized by providing the gas stream at a maximum allowable velocity without causing shearing of the liquid surface. Accordingly, in some embodiments, a stream is introduced using a shallow helical guide. At least one exit port for "sheared" vapors is provided to allow vapor to exit a container. In some embodiments, the exit port is provided through a middle of a helical entry port. In various embodiments, at least one sealing ring is provided on a lower circumference of the device to facilitate location and placement of the device, and to provide a gas seal and to obviate the need to rotate the device when affixing the device to a vial or other container.

Devices and embodiments of the present disclosure are contemplated for use with various containers and vessels and no limitation with respect to size, proportion, or shape of devices of the present disclosure is provided. It will be recognized that inventive aspects of the present disclosure are provided irrespective of size, shape, and intended use (e.g.

container size or shape). In some embodiments, systems are provided that are sized and operable to be provided with custom glass reactors of various types, allowing solvents to be evaporated from reaction mixtures directly. In some embodiments, features such as injection ports and helixes are integrated with a glass container. Accordingly, inventive aspects of the present disclosure are not limited to caps or cover members but also include containers with co-formed or integrated features for ingress and egress of fluid. In various embodiments, however, it is contemplated that devices of the present disclosure are sized and operable for use with benchtop laboratory equipment including containers and vials with an internal volume of between approximately 10 mL and 100 mL.

In various embodiments, methods and systems of the present disclosure contemplate the provision of a dry gas (e.g. nitrogen) with a sufficient flow rate and pressure to create a vortexing action in a liquid provided within a vial or container.

In various embodiments, devices of the present disclosure comprise a seal. Seals of the present disclosure are contemplated as being provided on a cap (for example) and are operable to contact a vial or container with which the cap is to be provided. The seal(s) preferably comprise the ability to prevent spillage of contents of the vial during use which facilitating sealing and unsealing of the vial without undue force. In some embodiments, seals of the present disclosure comprise annular elastomeric sealing elements provided on a cap.

It is an object of the present disclosure to enhance the evaporation and exhaust of certain vapors. It is a further object of the present disclosure to direct exhaust vapors away from a vessel and workspace in a highly contained manner. Although embodiments of the present disclosure are not limited to use with particular processes, liquids, or vapors, it is contemplated that embodiments of the present disclosure may be used in processes that produce hazardous or undesirable vapor. Controlled and safe exhaust of these vapors is provided by embodiments of the present disclosure as shown and described herein.

In some embodiments, containers and vials are heated or warmed to limit formation of water condensate on the vial, and to otherwise aid in an evaporative process. In certain embodiments, a support system or rack is provided to reduce a footprint for a plurality of containers and provide heating capabilities to at least one and preferably a plurality of vials.

In various embodiments, container and vial supporting systems are provided. For example, in some embodiments, rack systems are provided that are operable to receive and support at least one vial and preferably a plurality of vials. In some embodiments, a stackable arrangement is provided to minimize a footprint or area of spaced occupied on a bench or work station.

In various embodiments, a gas flow is provided to systems of the present disclosure and an exhaust flow of gas or vapor is facilitated by the provision of a vacuum or negative pressure in association with the gas outlet. In certain embodiments, exhaust is directed past a condenser (e.g. cold-finger condenser) to aid in solvent recovery and reduce volatile organic vapor. It is also contemplated that methods and systems of the present disclosure are operable to withstand heating of vials up to at least about 50 degrees Celsius during an evaporation process (and withstand associated heating of related or attached components).

Although caps and other components of the present disclosure are contemplated as comprising and being formed from various materials and no limitation with respect to material selection is provided herewith, certain embodiments of the present disclosure contemplate that caps are provided that comprise at least one of nylon, polyethylene(s), PEEK, and similar chemical resistant materials that prevent or minimize chemical degradation from various materials and contents provided within a container or system. Such materials offer the ability to "3D print" the caps and comprise chemically-compatible materials that are inexpensive to produce.

In various embodiments, methods and systems are provided for heating vessels in which fluids are being processed. In some embodiments, heating vessels to a controlled temperature and in a controlled manner improves the efficacy of evaporation. Embodiments of the present disclosure provide a feedback-loop controlled resistance film heater comprising a copper block (for example) to achieve heating goals and stability. In some embodiments, an insert is provided which offers intimate contact between a heater and a vessel. The insert is contemplated as being a silver-plated copper-filled silicone insert, but is not limited to such an arrangement. A modular configuration of a heating block is provided. Spring-loaded evaporator heating elements are provided and pressure or vacuum circuits are controlled via a gas solenoid manifold block to permit operation with any number of vessels. Each individual evaporator manifold is contemplated as comprising components which can be 3D printed or injection molded and assembled by means of adhesive or sonic welding. Spring-loaded elements as shown and described herein provide for accommodation of and tolerance variability between vessels, and allows components of the present disclosure to be positioned and sealed on groups of vessels of any given height. Accordingly, benefits are provided wherein multiple vessels of different heights can be processed at the same time and within a single manifold.

In various embodiments of the present disclosure, methods for evaporating solvents from a fluid are provided. In one embodiment, a method is provided that comprises providing a heat-conductive rack. At least one and preferably a plurality of vials are loaded onto the heat-conductive rack. The rack is placed into a heated block with a raised manifold. The manifold is lowered and the evaporative process is started. In some embodiments, the evaporative process comprises providing a cap or cover member as shown and described herein and providing a gas flow through the cap or cover at a desired angle and flow rate. Exhaust gas is directed through an outlet provided in the cap or cover member.

In some embodiments, systems of the present disclosure are provided with one or more sensors to sense at least one of temperature, pressure, and fluid flow (velocity, mass, etc.). In some embodiments, systems of the present disclosure comprise a temperature controller and at least one temperature sensor. A dial, knob, or similar user-interface is provided to control temperature and energy provided by a heating block of the present disclosure. It is also contemplated a display is provided to indicate a temperature and/or temperature setting to a user. In some embodiments, a timed air pressure regulator is provided to automatically provide a predetermined amount of air or gas flow to containers.

Various embodiments of the present disclosure are contemplated for use in laboratory settings. For example, it is contemplated that devices, systems and methods of the present disclosure are useful for applications wherein it is desirable to remove a solvent from a vial (for example) in order to concentrate a sample in the vial. Devices, methods and systems of the present disclosure allow for solvent removal with the simple application of a forced stream of gas (nitrogen, for example) on a liquid surface.

In one embodiment, an apparatus operable for use in evaporating solvent from a container is provided. The apparatus comprises a closure member comprising an upper portion and an extension. The upper portion comprises an inlet provided at an angle relative to a longitudinal axis of the closure member. The extension is operable to extend into an internal volume of a container, and the extension comprises a gas port for ejecting fluid provided to the inlet into the container. An exit channel extends through the closure member and the closure member comprises an annular sealing element.

In one embodiment, a system operable for use in evaporating solvent from a container is provided. The system comprises a heating element operable to receive and support at least one container. The heating element comprises an electrical connection and the heating element is operable to receive electrical power and convert electrical power to thermal energy. At least one gas port is provided that comprises an inlet and an outlet, and the at least one gas port is moveable relative to the heating element. The at least one gas port is operable to direct a gas flow into an internal volume of at least one container provided in the heating element and is further operable to vent or exhaust evaporated solvent from the at least one container.

In one embodiment, a system operable for use in evaporating solvent from a container is provided. The system comprises a plurality of cover members each comprising a gas inlet and a gas outlet. An extension is provided that is operable to extend into an internal volume of a container, and the extension comprises a gas port for ejecting fluid provided to the inlet. The gas outlet comprises an exit channel extending through the closure member. An annular sealing element is provided, and each of the plurality of cover members are provided within a body member, and the body member is secured to and adjustable relative to a support member. Each of the plurality of cover members comprise at least one biasing member in force transmitting communication with the body member.

In various embodiments, methods, systems and devices are provided for sweeping or clearing a headspace of a vessel. For example, certain embodiments of the present disclosure contemplate methods and systems for sweeping the headspace of a reaction vessel with one or more inert gases to protect air-sensitive reactions during the delivery of reagents to the vessel and other process steps.

In some embodiments, a reaction vessel is provided and one or more inert gases (e.g. compressed argon or nitrogen) is directed into the vessel at an angle. The angle is preferably a low angle and is contemplated as varying based on various design considerations including but not limited to vessel size. The provision of the gas(es) creates a vortex inside the vessel and sweeps or clears the headspace of a fluid or gas residing in the headspace. This initial fluid or gas is contemplated as comprising one or more gases (e.g. oxygen, water vapor) that are undesirable for a specific reaction or process.

Various embodiments of the present disclosure provide systems that automatically deliver reagents to vessels in non-inert environments, thus creating the possibility that non-inert gases or elements enter the vessel or otherwise combine with a reaction. It is an object of embodiments of the present disclosure to provide means for, methods for and systems operable to clear these non-inert gases and create a gas barrier for a reaction mixture.

While embodiments of the present disclosure are contemplated as being useful for clearing certain materials and gases from the headspace of a vessel (e.g. moist air and/or oxygen), the present disclosure is not limited to ridding or replacing an internal volume of a container or headspace with any particular element, gas, or substance. In various embodiments, it is contemplated that certain gases and substances that are known to adversely affect a desired reaction or process (e.g. oxygen) are cleared or removed from a headspace and that space is filled or replaced with one or more preferred substances (e.g. argon or nitrogen). However, methods, systems and devices of the present disclosure are not limited to any specific gas or substance.

In some embodiments, vessels and related equipment for clearing a headspace of a vessel are handled manually or by a robotic system as shown and described herein.

In one embodiment, a system for delivering fluid to an internal volume of a container is provided. The system comprises a container receiving member operable to receive a container, wherein the container receiving member comprises a fluid port having a first end on an exterior surface of the container receiving member and a second end on an interior of the container receiving member. At least a portion of the fluid port is provided at an angle relative to horizontal and wherein the fluid port is operable to deliver a flow of fluid at an angle relative to a container received by the container receiving member. The container receiving member comprises an aperture and wherein the aperture provides access through the container receiving member.

In various embodiments, methods of treating or sweeping a container are provided. In one embodiment, a method of providing an inert gas to a container is provided. A container receiving member is provided that comprises a fluid port for delivery of a first fluid. A container is provided in communication with the container receiving member and a quantity of a second fluid is provided within the container. A flow of first fluid is provided through the fluid port. A concentration of oxygen in the container is monitored and upon the concentration of oxygen being less than or equal to a predetermined value, a reaction is caused to occur within the second fluid. Reaction(s) may be caused to occur by various methods including, but not limited to, inserting reagents into the container.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In addition, the materials, methods, and examples are illustrative only and are not intended to be necessarily limiting.

DESCRIPTION OF THE DRAWINGS FIG. 1 is an elevation view of a container and cap according to one embodiment of the present disclosure.

FIG. 2A is an elevation view of a vial and a cap according to one embodiment of the present disclosure.

FIG. 2B is an elevation view of a vial and a cap according to one embodiment of the present disclosure.

FIG. 2C is an elevation view of a vial and a cap according to one embodiment of the present disclosure.

FIG. 2D is an elevation view of a vial and a cap according to one embodiment of the present disclosure.

FIG. 2E is an elevation view of a vial and a cap according to one embodiment of the present disclosure.

FIG. 3 is a perspective view of an evaporative system and method according to one embodiment of the present disclosure.

FIG. 25A is a perspective view of an inerting device according to one embodiment of the present disclosure.

FIG. 25B is a perspective view of a component of the inerting device of the embodiment of FIG. 25A.

FIG. 26A is an elevation view of an inerting device according to one embodiment of the present disclosure.

FIG. 26B is a perspective view of components of the inerting device of the embodiment of FIG. 26A.

FIG. 26C is an elevation view of a component of the inerting device of the embodiment of FIG. 26A.

FIG. 28A is a perspective of an inerting device and system according to one embodiment of the present disclosure.

FIG. 28B is a top view of the inerting device and system of the embodiment of FIG. 28A.

FIG. 28C is a perspective view of an inerting device according to the embodiment of FIG. 28A.

FIG. 29A is a perspective view of an inerting device and system according to one embodiment of the present disclosure.

FIG. 29B is a plot showing oxygen concentration in a vessel over time.

DETAILED DESCRIPTION

Figure 1:
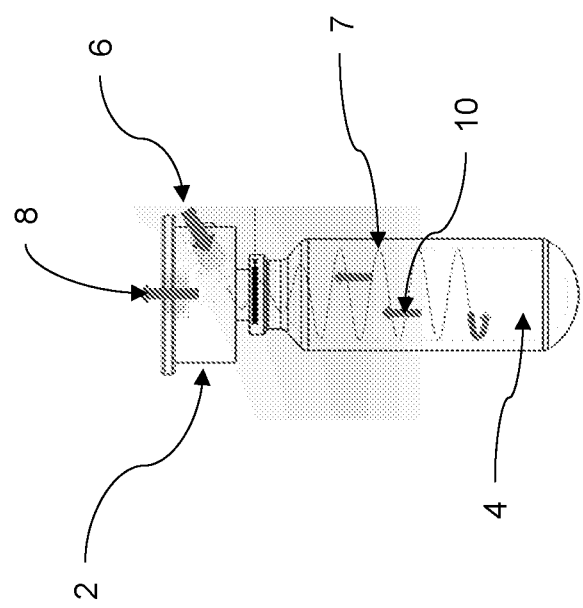

FIG. 1 is an elevation view of a system according to one embodiment of the present disclosure wherein a closure or cap 2 is provided in combination with a vial 4. Although the vial 4 is shown and described as a particular device in FIG. 1, systems and caps of the present disclosure are contemplated for use with various devices and containers and inventive aspects of the present disclosure are not limited to the particular vial 4 shown in FIG. 1. The vial 4 is contemplated as housing a fluid. The fluid is contemplated as comprising a liquid from which gas or vapor 10 is to be evaporated or removed. The cap 2 of FIG. 1 comprises an inlet 6. The inlet 6 comprises a port or channel that is operable to receive and direct a fluid (e.g. dry air, nitrogen, etc.) into the internal volumes of the cap 2 and the vial 4. The inlet 6 preferably comprises a channel with a central axis that is provided at an angle relative to a vertical axis of the cap 2. In various embodiments, the inlet 6 comprises a channel provided at an angle of between approximately 40 and 90 degrees, and preferably of about 70 and 80 (and more preferably about 72.5 degrees) relative to the central axis of the cap 2. The inlet is thus operable to direct gas into the internal volume of the vial 4 and forming a vortex in the gas or fluid flow 7. The fluid flow 7 preferably approaches a surface of the fluid in the vial 4 at an oblique angle. A shearing effect is operable to increase an evaporation and removal of solvent vapors 10 (for example) from the fluid. The solvent vapors are thereafter directed from the vial 4 and proceed to exit the system and the cap 2 through an outlet 8. Although not shown in FIG. 1, the outlet 8 can be provided with and/or secured to a vacuum line to aid in removal and ventilation. Alternatively, the vapor 10 may simply vent from the cap 2 and be drawn upwardly into a conventional hood (for example).

Caps 2 of the present disclosure are contemplated as being press fit or otherwise directly connected to the vial. However, no limitation with respect to the mating and connection between caps and vials is provided herewith. In some embodiments, for example, caps of the present disclosure are contemplated as comprising threads operable for connection to corresponding threads of a vial or similar container.

FIGS. 2A-2E are elevation views of various caps 2 provided in combination with different vials 4. As shown, caps 2 of the present disclosure are contemplated as being provided with a plurality of different containers including, for example, a 20 mL vial (FIG. 2A), 24/40 round bottom flasks (FIG. 2B), 14/20 round bottom flasks (FIG. 2C), and microwave reactor flasks (FIGS. 2D & 2E). A conduit or gas line 12 is provided in combination with each of the inlets 6 of the caps 2 to direct gas into the internal volume of the containers 6. The caps 2 comprise outlets 8. In some embodiments, the outlet 8 is coupled with a vacuum to assist in the removal of vapor and evaporated contents from the vials 4. It is also contemplated that a cold-trap is provided to enable solvent recovery. In some embodiments, a vacuum source and a cold-trap are provided in series and in combination with the outlet 8 of the cap. As shown in FIGS. 2A-2E, a sealing member 14 is provided. In various embodiments, the sealing member 14 comprises an annular rubber gasket or ring operable to create or improve a seal or connection between the cap 2 and the vial 4.

FIG. 3 is an elevation view of a vial 4 provided in use in a laboratory setting for illustration purposes. As shown, a vial 4 is provided and connected to or supported in a workstation by one or more known clamps or similar devices. The position of the vial 4 can be adjusted by a user. Preferably, however, the vial 4 is provided such that a central axis of the vial 2 is provided parallel to the force of gravity and a surface of the housed liquid is generally horizontal. An inlet 6 is provided with a gas line 12. As shown in FIG. 3, a vortex is created in the fluid housed in the container 4 by a shearing force produced by the inject gas from the inlet 6. The shearing force and resulting vortex creates a turbulence that enhances evaporation and various contents of the vial 4.

Known systems for applying a gas flow and enhancing an evaporative process suffer from various drawbacks. In some systems, vessels are provided with an open end and a needle or syringe is provided to inject a fluid toward a surface of a fluid contained within the vessel. Such arrangements and methods suffer from various drawbacks including, for example, the inability to provide a gas (e.g. nitrogen) through the needle at certain flow rates without spilling or ejecting fluid from the vessel. The relatively low flow rate and high pressure of fluid from a needle or cannula is not well suited for applications and processes contemplated by the present disclosure. Embodiments of the present disclosure address these issues and provide for an improved system as shown and described herein.

Figure 4:
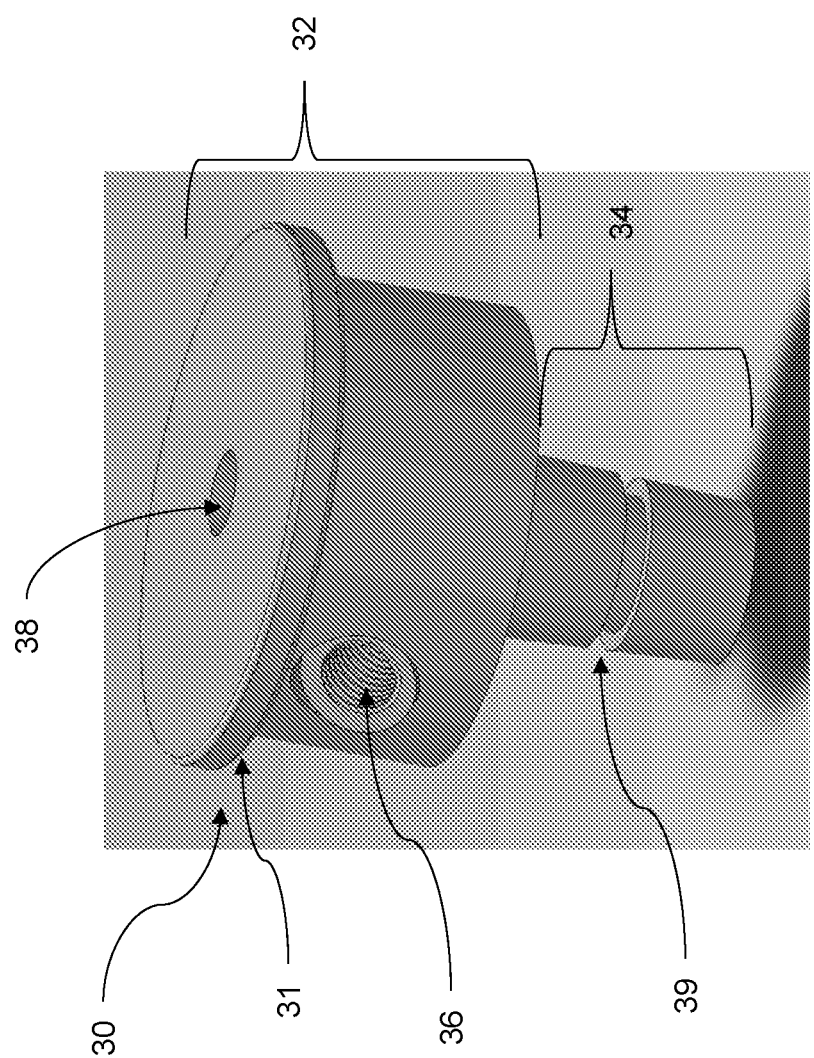
FIG. 4 is a perspective view of a cap according to one embodiment of the present disclosure.
Figure 5:
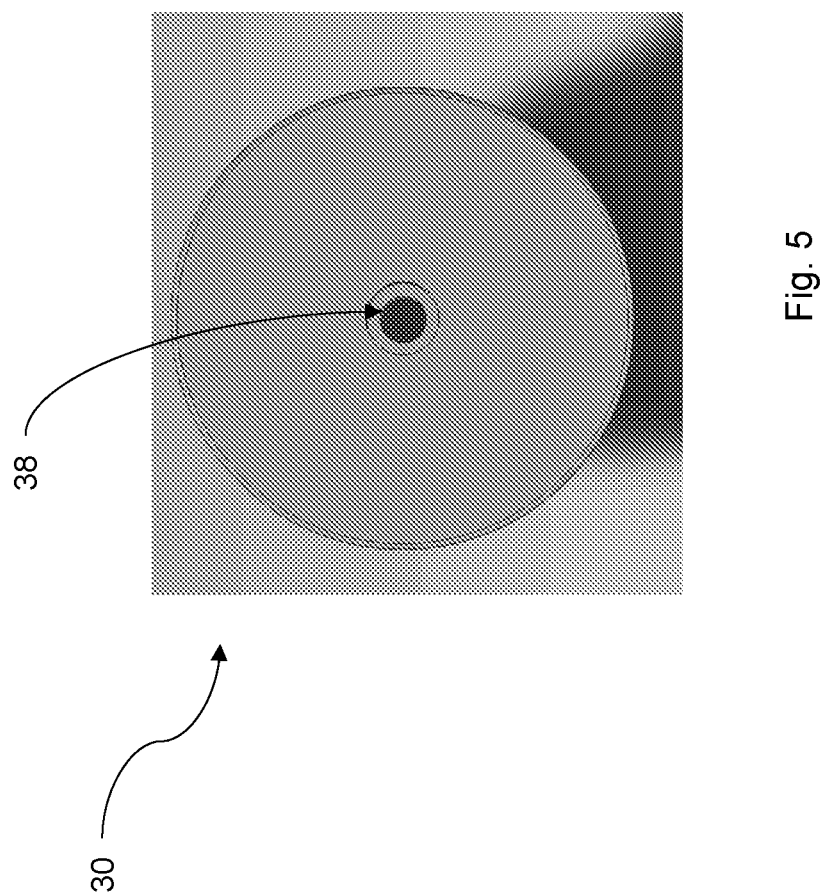
FIG. 5 is a top plan view of the cap according to the embodiment of FIG. 4.
Figure 6:
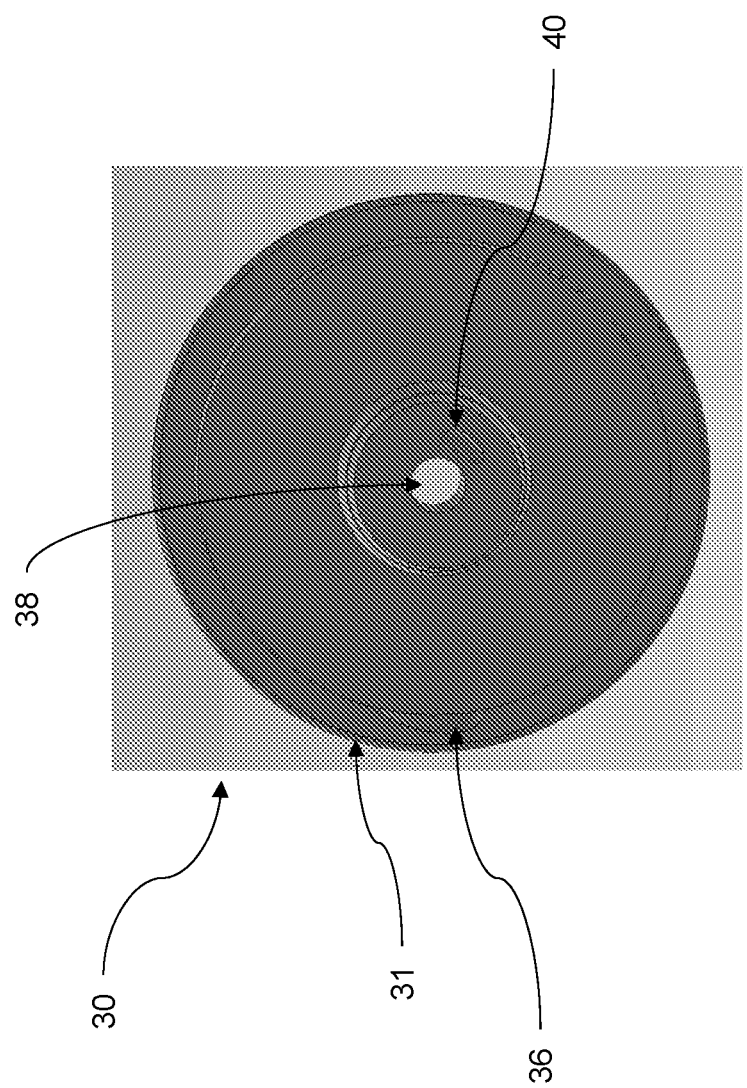
FIG. 6 is a bottom plan view of the cap according to the embodiment of FIG. 4.

FIG. 4 is a perspective view of a cap 30 according to one embodiment of the present disclosure. As shown, the cap 30 comprises an upper portion 32 and an extension 34. The upper portion of FIG. 4, and various other embodiments of the present disclosure comprises a lip 31 that extends outwardly from a remainder of the upper portion 32. The lip 31 comprises a contact area or gripping surface such that a user may easily grasp the cap 30 for removal (for example). The extension 34 is contemplated as being operable to extend into a vial or container (not shown in FIG. 4, but see 2 in FIG. 1, for example). The upper portion 32 comprises an inlet 36 and an outlet 38. The inlet is provided at an angle relative to at least a longitudinal, vertical axis of the cap 30. The extension 34 comprises at least one seat 39 for receiving a sealing element (not shown in FIG. 4). In use, the cap 30 is provided with a container by inserting the extension 34 into the appropriately sized vial, flask, or other container. A gas line is connected to the inlet 36, which may comprises a threaded connection, and gas is directed into the vial or container and through the extension 34. FIG. 5 is a top plan view of the device 30 of FIG. 4. As shown, an exit port 38 is provided. Gas and evaporated vapor from a fluid in the container is directed or vented upwardly and allowed to escape from the system by flowing through the outlet. In some embodiments, a vacuum source and/or vacuum line is provided in connection with the outlet 38 and vapor and gas is drawn from the system and expelled. FIG. 6 is a bottom plan view of the device of the device 30 of FIGS. 4-5. As shown in FIG. 6, a fluid port 40 is provided for directing fluid (e.g. nitrogen gas) to an internal volume of a container and liquid housed therein. The fluid port 40 is in fluid communication with the inlet 36 and preferably ejects and directs fluid at a desired angle to create a shearing effect on liquid housed within a container. The exit port 38 is shown in FIG. 6 as comprising a bore or through hole and providing a channel wherein gas and evaporated contents from the liquid can be expelled from the system.

Figure 7:
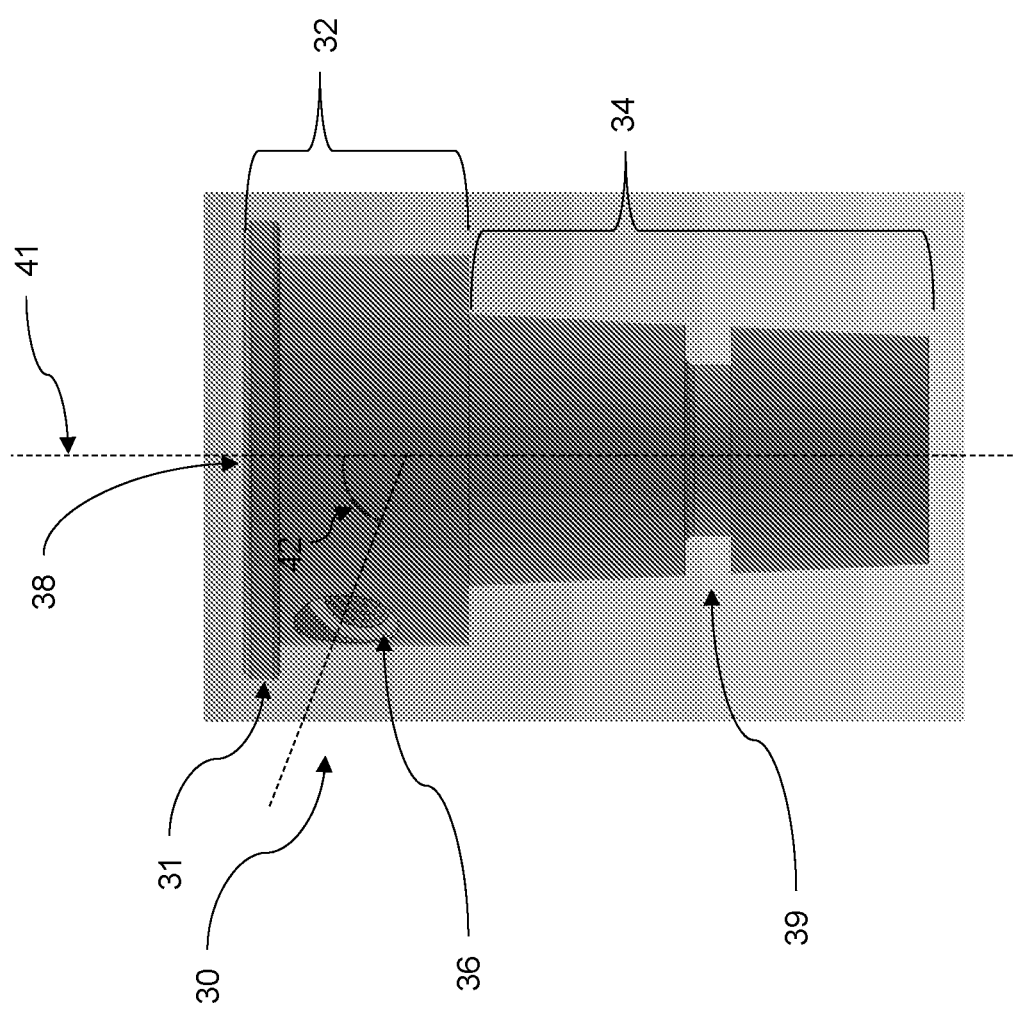
FIG. 7 is an elevation view of a cap according to one embodiment of the present disclosure.
Figure 8:
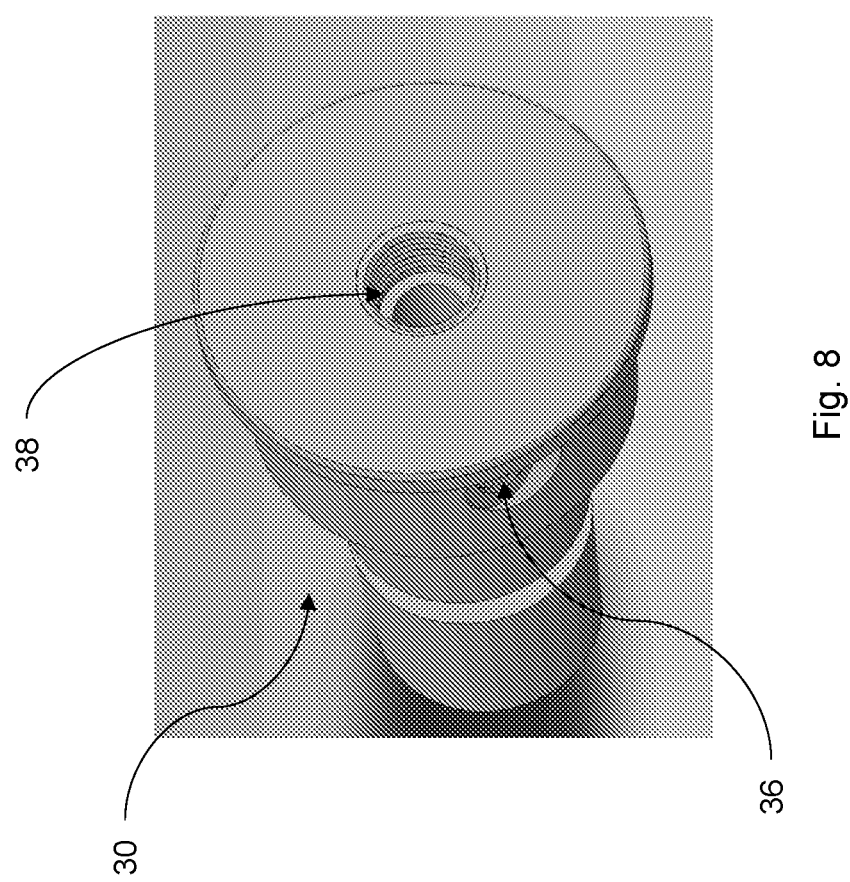
FIG. 8 is a perspective view of the cap according to the embodiment of FIG. 7.
Figure 9:
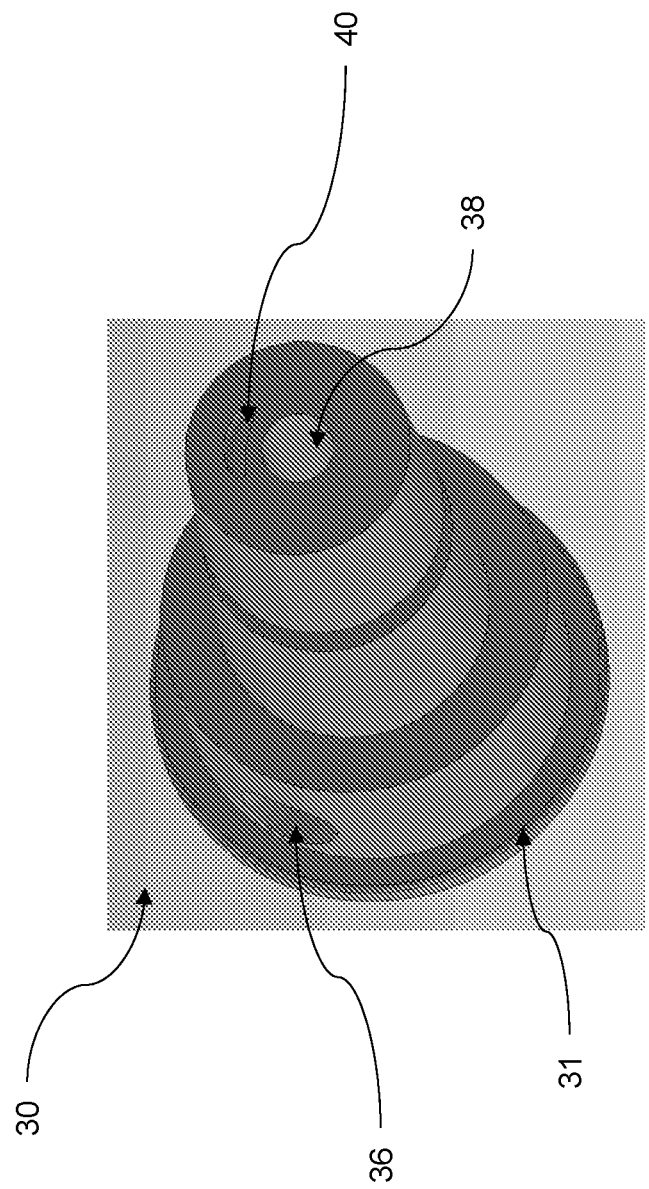
FIG. 9 is a bottom perspective view of the cap according to the embodiment of FIG. 7.

FIGS. 7-9 are front elevation, top perspective, and bottom perspective views of a cap 30 according to another embodiment of the present disclosure, respectively. Various components comprising like numbering as shown and described with respect to FIGS. 4-6 are provided in FIGS. 7-9. While the device of FIGS. 7-9 comprises various similar features and is intended for use in similar operations as that shown in FIGS. 4-6, the device 30 of FIGS. 7-9 is operable for use with a different container as that shown in FIG. 4-6. For example, it is contemplated that the device 30 of FIGS. 7-9 comprises a cap suitable for use with a 24/40 flask, whereas the device of FIGS. 4-6 is suitable for use with a 14/20 flask. In various embodiments of the present disclosure, including but not limited to that shown in FIG. 7, the cap 30 comprises a longitudinal axis 41. The inlet 36 is provided at an angle 42 relative to at least the longitudinal axis 41.

Figure 10:
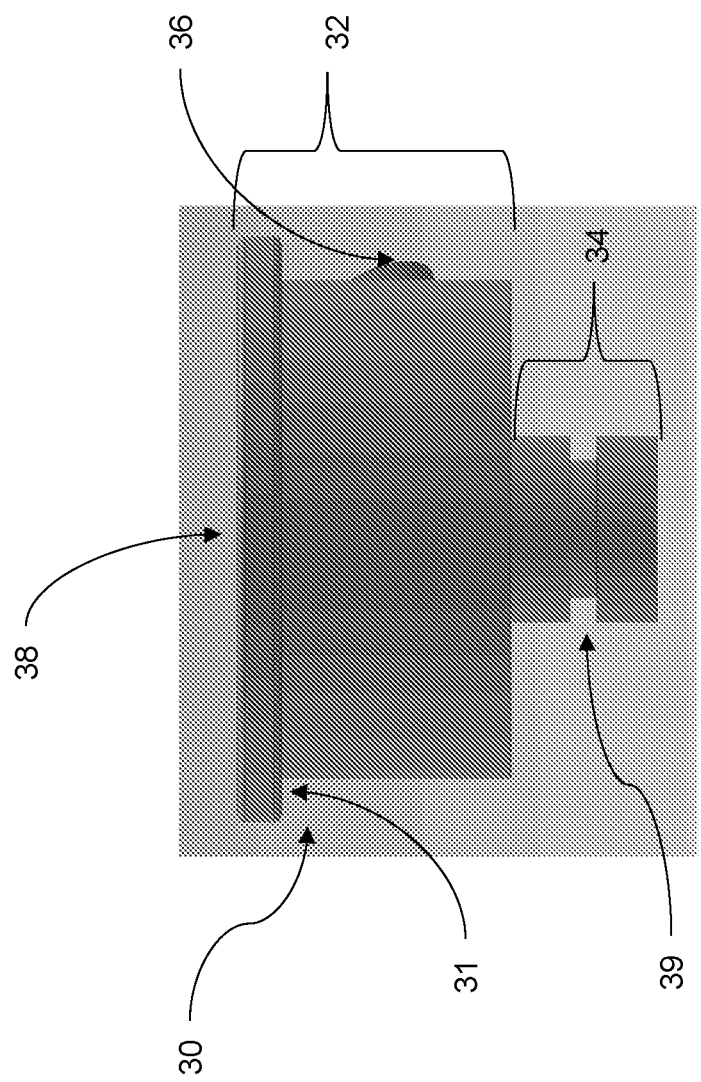
FIG. 10 is a front elevation view of a cap according to one embodiment of the present disclosure.
Figure 11:
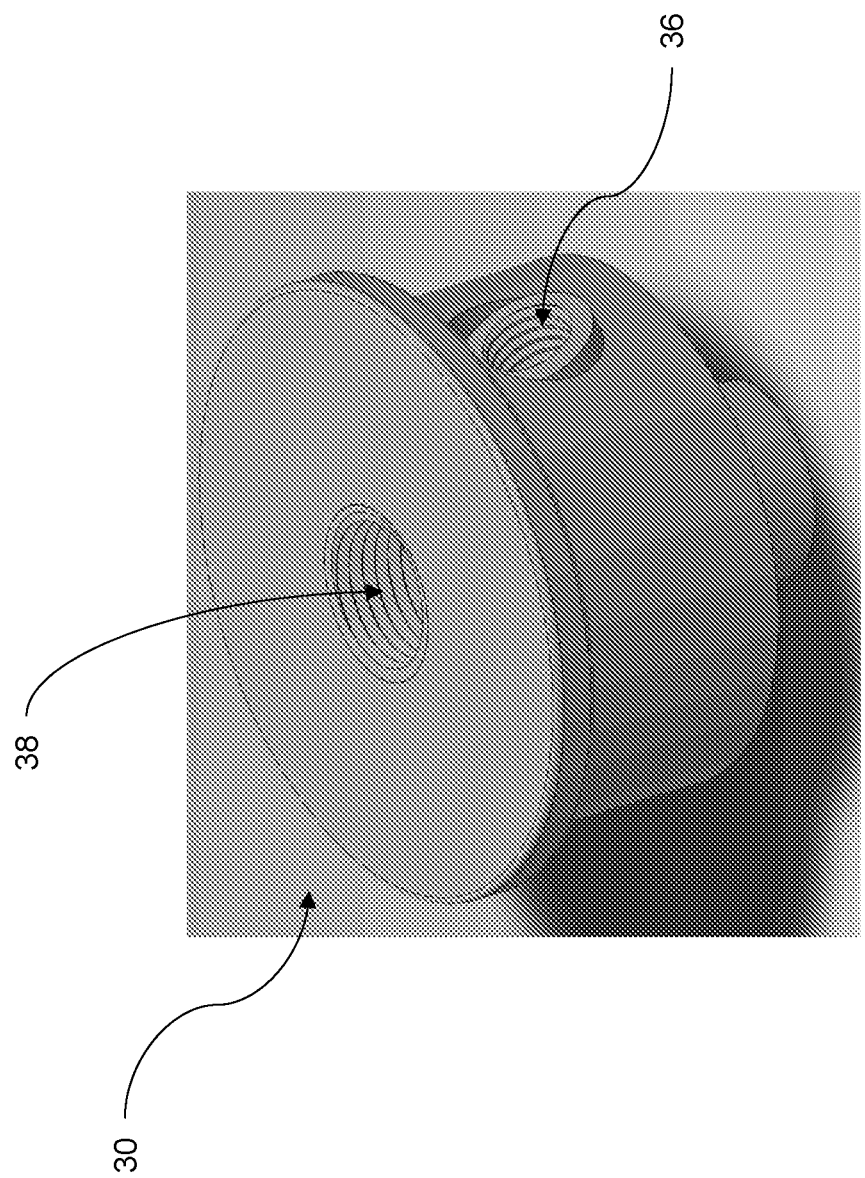
FIG. 11 is a perspective view of the cap according to the embodiment of FIG. 10.
Figure 12:
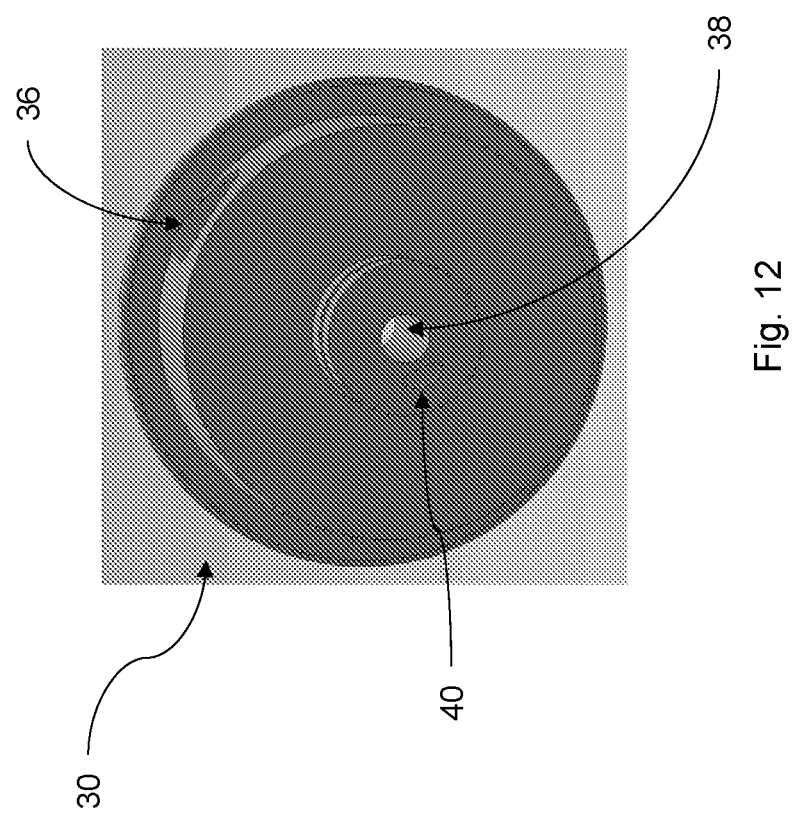
FIG. 12 is a bottom perspective view of the cap according to the embodiment of FIG. 10.

FIGS. 10-12 are front elevation, top perspective, and bottom perspective views of a cap 30 according to another embodiment of the present disclosure. Various components comprising like numbering as shown and described with respect to FIGS. 4-6 are provided in FIGS. 10-12. While the device of FIGS. 10-12 comprises various similar features and is intended for use in similar operations as that shown in FIGS. 4-6, the device 30 of FIGS. 10-12 is operable for use with a different container as that in FIG. 4-6. For example, it is contemplated that the device 30 of FIGS. 10-12 comprises a cap suitable for use with a microwave flask, whereas the device of FIGS. 4-6 is suitable for use with a 14/20 flask.

Figure 13:
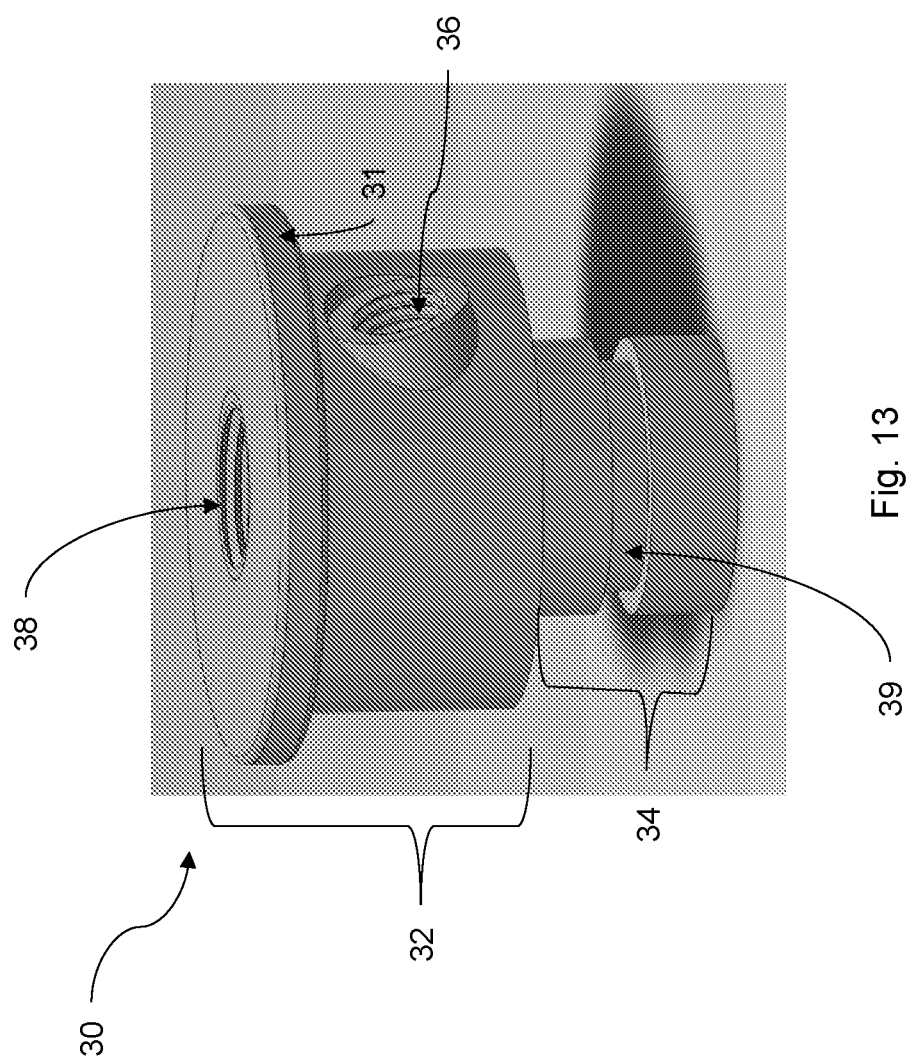
FIG. 13 is a perspective view of a cap according to one embodiment of the present disclosure.
Figure 14:
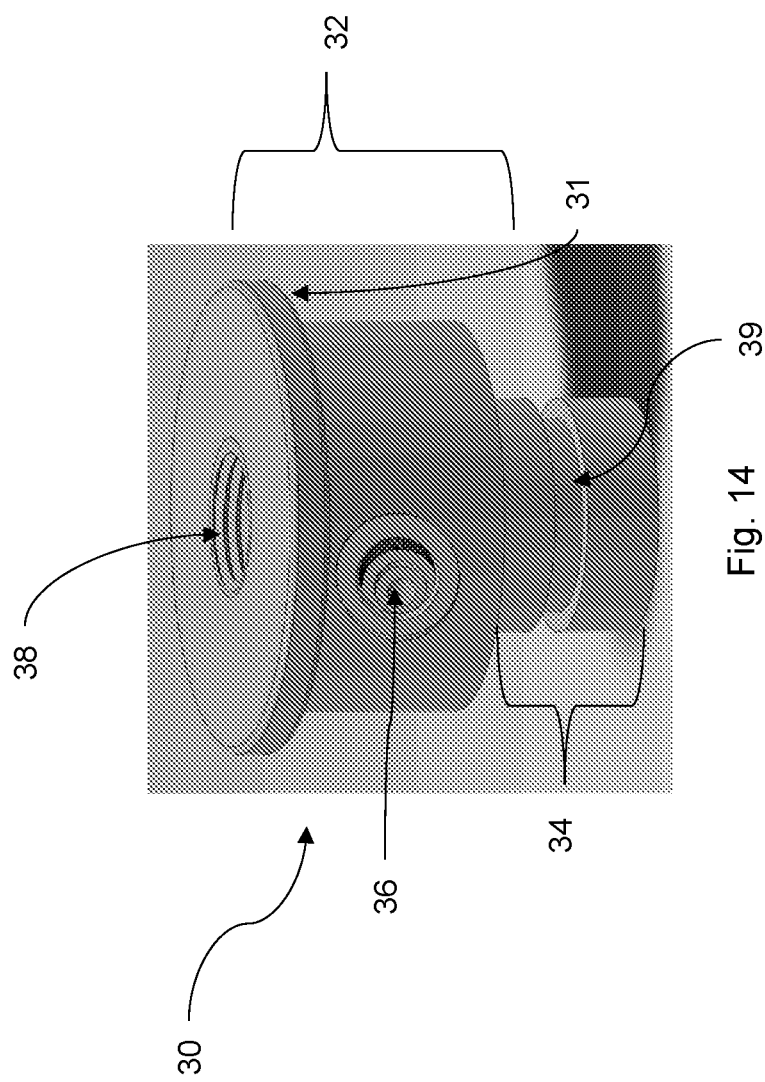
FIG. 14 is a perspective view of the cap according to the embodiment of FIG. 13.
Figure 15:
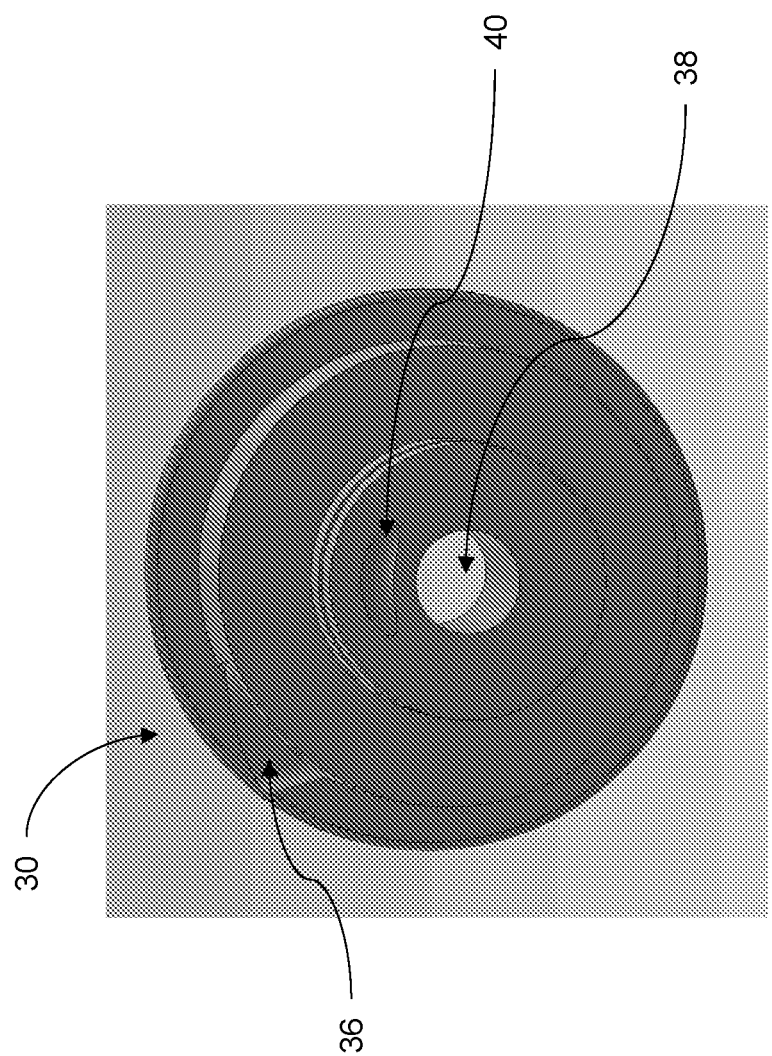
FIG. 15 is a bottom perspective view of the cap according to the embodiment of FIG. 14.

FIGS. 13-15 are front elevation, top perspective, and bottom perspective views of a cap 30 according to another embodiment of the present disclosure. Various components comprising like numbering as shown and described with respect to FIGS. 4-6 are provided in FIGS. 13-15. While the device of FIGS. 13-15 comprises various similar features and is intended for use in similar operations as that shown in FIGS. 4-6, the device 30 of FIGS. 13-15 is operable for use with a different container as that in FIG. 4-6. For example, it is contemplated that the device 30 of FIGS. 13-15 comprises a cap suitable for use with a scintillation flask, whereas the device of FIGS. 4-6 is suitable for use with a 14/20 flask. As shown in FIG. 14, the inlet 36 of the cap 30 of the embodiment of FIG. 14 comprises an offset feature. The inlet 36 is provided offset from a lateral midline of the device 30.

Figure 16:
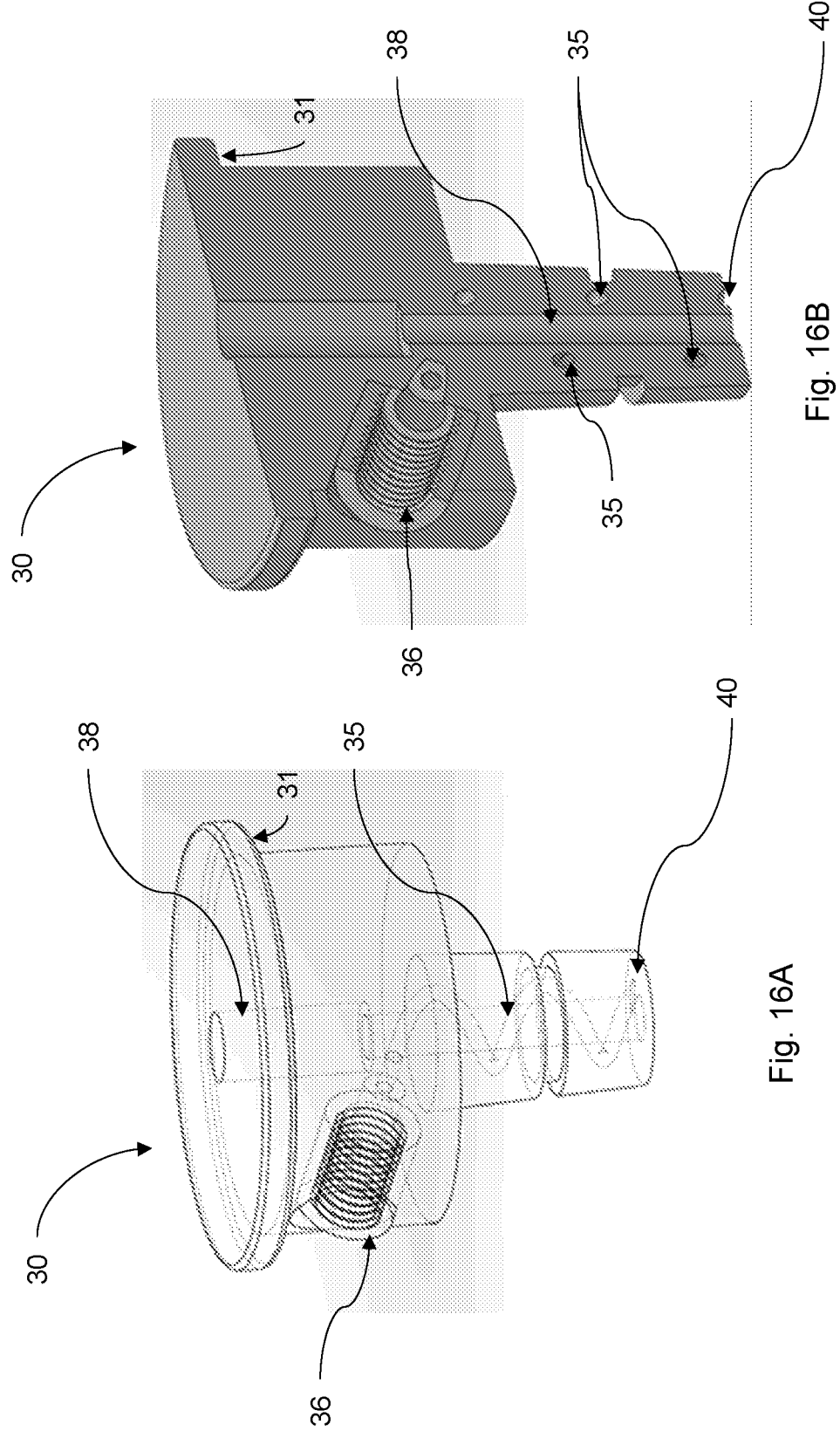
FIG. 16A is a perspective view of a cap according to one embodiment of the present disclosure.
FIG. 16B is a cross-sectional perspective view of a cap according to one embodiment of the present disclosure.

FIG. 16A is a perspective view of a cap provided in phantom and showing a conduit 35 in the form of a helix extending through the cap 30. As shown, the conduit 35 extends between the inlet 36 and an exit port 40 from which fluid (e.g. nitrogen gas) is expelled. Although a single helical conduit 35 is shown in FIG. 16A, preferred embodiments are contemplated that comprise a plurality of conduits, including but not limited to a plurality of helical conduits. Although no limitation with respect to a number of conduits is provided herewith, certain embodiments are contemplated as comprising three helical conduits extending between at least one inlet and at least one outlet. In some embodiments, each conduit comprises a dedicated outlet. For example, embodiments comprising three conduits also comprise three outlets. Embodiments with a plurality conduits contemplated that the plurality of conduits extends from a single inlet or, in alternative embodiments, a dedicated inlet for each conduit is provided.

FIG. 16B is a cross-sectional elevation view of a cap 30 according to one embodiment of the present disclosure. As shown, the cap 30 comprises an inlet 36. The inlet 36 extends to an extruded helical passage 35 through the cap. In various embodiments, the extruded helix comprises a constant angle of between approximately 10 and 30 degrees relative to a horizontal plane. In some embodiments, the helix angle is approximately 17.5 degrees relative a horizontal plane (e.g. a plane or surface of a fluid within a vessel). One of ordinary skill in the art will recognize that the exit angle of the outlet 40 of the helix 35 is, under at least some circumstances, of paramount importance for providing a desired gas flow to a fluid positioned beneath the cap 30. Accordingly, certain embodiments of the present disclosure may comprise inlets 36 and passageways 35 of various different angles relative to the exit port 40. For example, in some embodiments, the inlet 36 comprises a horizontal or vertical member and at least one of the helix 35 and exit 40 are provided at a desired angle that is distinct from the inlet 36.

Figure 17:
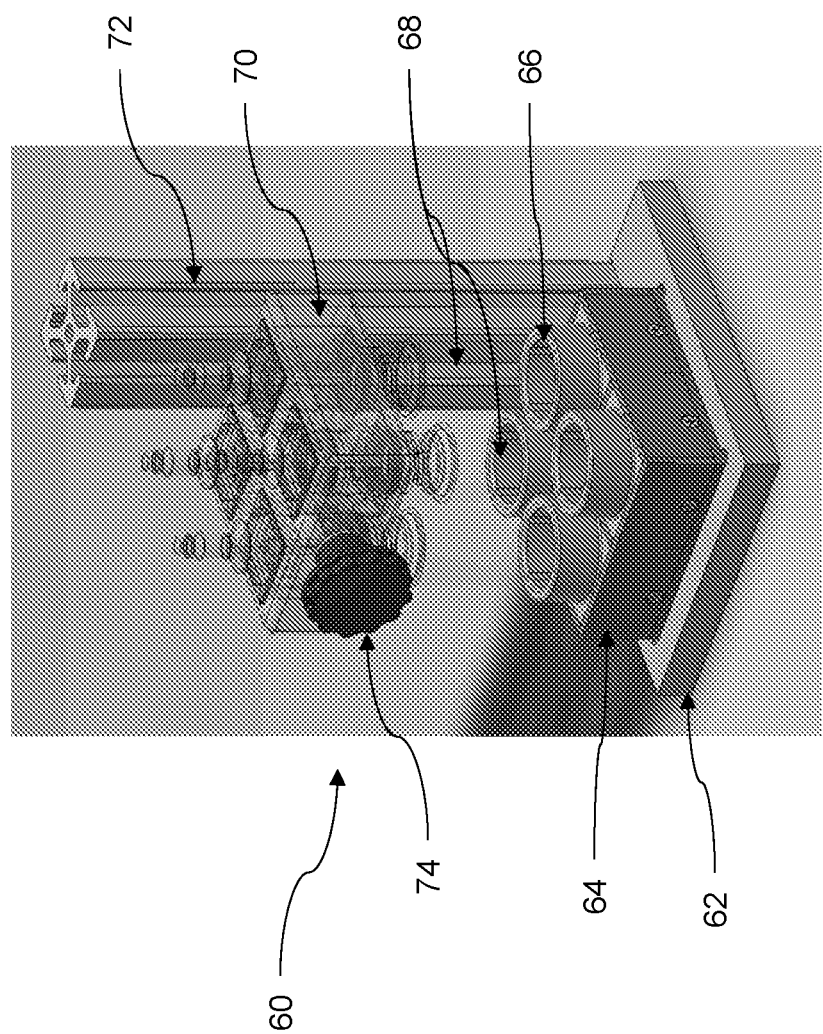
FIG. 17 is a perspective view of a support system according to one embodiment of the present disclosure.

FIG. 17 is a perspective view of a system 60 according to one embodiment of the present disclosure. As shown, the system 60 is contemplated as comprising a benchtop system suitable for and operable to be provided on a table or benchtop 62. However, no limitation with respect to size, intended use, or intended placement of the device during operation is provided herewith. The system 60 of FIG. 17 comprises a heating block 64 provided with a 2×2 arrangement of wells. The system 60 and depicted block 64 is contemplated as being capable of receiving up to four vessels for processing at one time. Embodiments of the present disclosure contemplate providing any number of devices including only a single vial, and no upper limit of vials or containers to be processed and/or heated. Accordingly, it will be recognized that the system 60 and heating lock 64 is not limited to a 2×2 arrangement of wells. In various embodiments, the heating block 64 comprises a copper block operable to receive an electrical current and convert electrical power to thermal energy to be provided to vials and fluid contained therein (e.g. via conduction).

A plurality of inserts 66 are provided within each well of the heating block 64. The inserts 66 are contemplated as comprising silver-plated copper-filled silicone inserts that are operable to receive and house various containers including, for example, vials for housing fluid to be evaporated. In some embodiments, inserts 66 are provided that comprise silver-plated copper powder, flakes, or similar particles suspended in an elastomeric silicone matrix to provide a high performance conductive material for securing vials. Vials 68 are shown in phantom in FIG. 17. The vials 68 may comprise vials of various different volumes, heights, and dimension. A manifold 70 is provided. The manifold 70 is contemplated as comprising an adjustable element at least in that its vertical position is selectively adjustable and the manifold 70 can be raised and lowered to adjust a relative position of the manifold 70 and vials or other containers provided in the system. In the depicted embodiment, a vertical support 72 is provided upon which the manifold 70 is vertically adjustable. A knob 74 is provided in communication with at least fastener to selectively loosen and secure a vertical position of the manifold 70.

Figure 18:
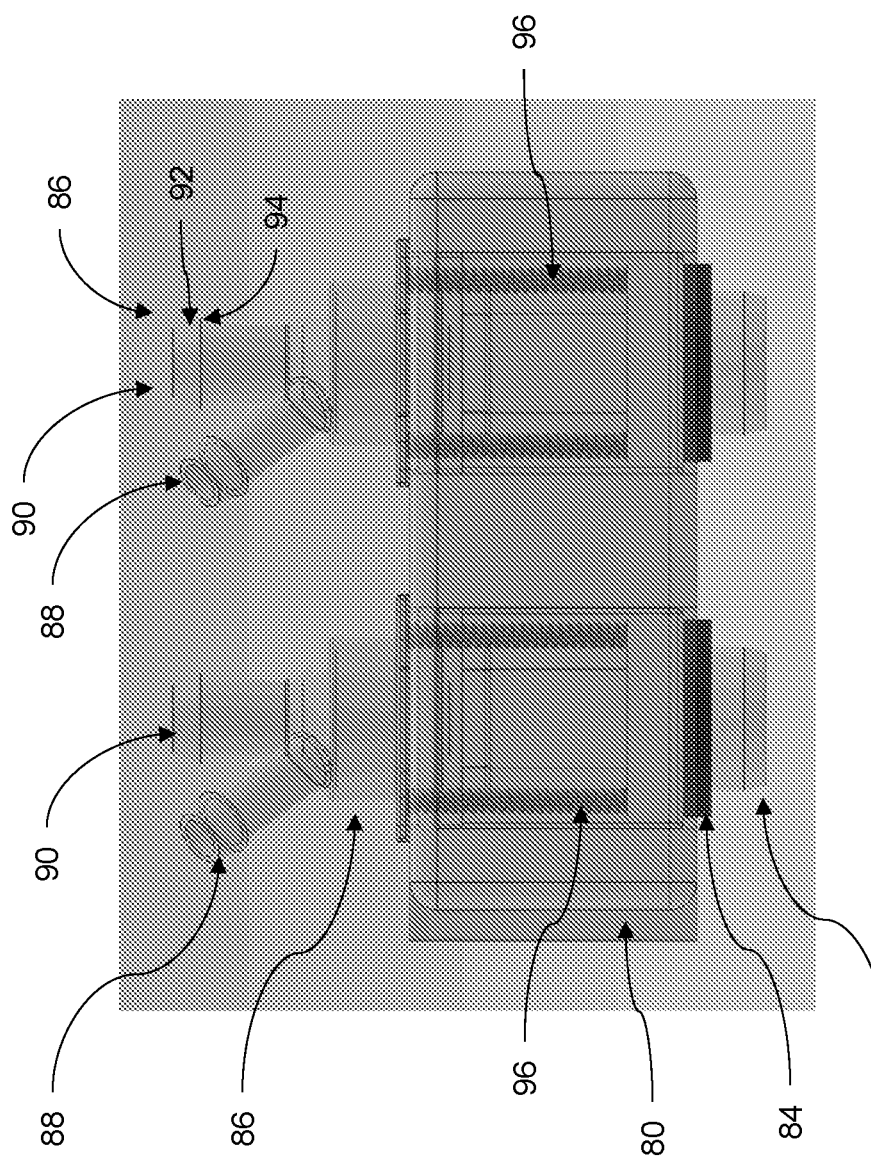
FIG. 18 is an elevation view of a component of the system of the embodiment of FIG. 17.

FIG. 18 is a front elevation view of a manifold 70 according to one embodiment of the present disclosure. As shown, the manifold 70 comprises a body member 80. A plurality of evaporative caps 86 are provided in association with the body member 80. In at least some embodiments, the evaporative caps are provided within the body member 80 such that each of the plurality of caps 86 can be selectively and easily moved together. Additionally, in certain embodiments of the present disclosure including that of FIG. 18, the caps 86 are moveable within the body member 80. The caps 86 are contemplated as each being provided in contact and fluid communication with a vial or similar container. As one of ordinary skill in the art will recognize, vials or containers intended to comprise the same internal volume (or other dimension) will vary somewhat in overall height or shape due to variability in manufacturing and glass formation (for example). Embodiments of the present disclosure contemplate processing liquids and evaporating solvents (for example) simultaneously from a plurality of vials and accommodating various discrepancies in vial size. Specifically, and with reference to FIG. 18, the body member 80 comprises a common carriage member for a plurality of caps 86 such that the caps 86 and body member 80 may be easily raised and lowered into position for use. The caps 86 are displaceable within the body member 80 and are biased downwardly (with reference to FIG. 18) by biasing members 96 to provide a clamping or compression force upon the vial with which each cap 86 is associated.

The caps 86 each comprise an extension 82 that is operable to extend at least partially into a container (e.g. a vial or flask). A gasket member 84 is provided to provide a seal between the manifold 70 and a container (not shown in FIG. 18). In some embodiments, the gasket comprises a silicone foam gasket or a similar closed cell foam gasket to provide a suitable seal at the lip or opening of a container. Extending from the upper portion of the caps 86 are a plurality of gas inlets 88 and gas outlets 90. The inlet 88 is operable to receive a fluid flow (e.g. a flow of nitrogen gas) from a gas line or similar component (not shown in FIG. 18).

The outlet 90 is operable to vent or allow egress of fluid and evaporated contents from a container. In some embodiments, the outlet 90 comprises an angle portion 92 and a lip 94 operable for receiving and connecting to a vacuum line. The vacuum line is operable to enhance evaporation within a container and/or extract evaporated contents in a more efficient manner.

Figure 19:
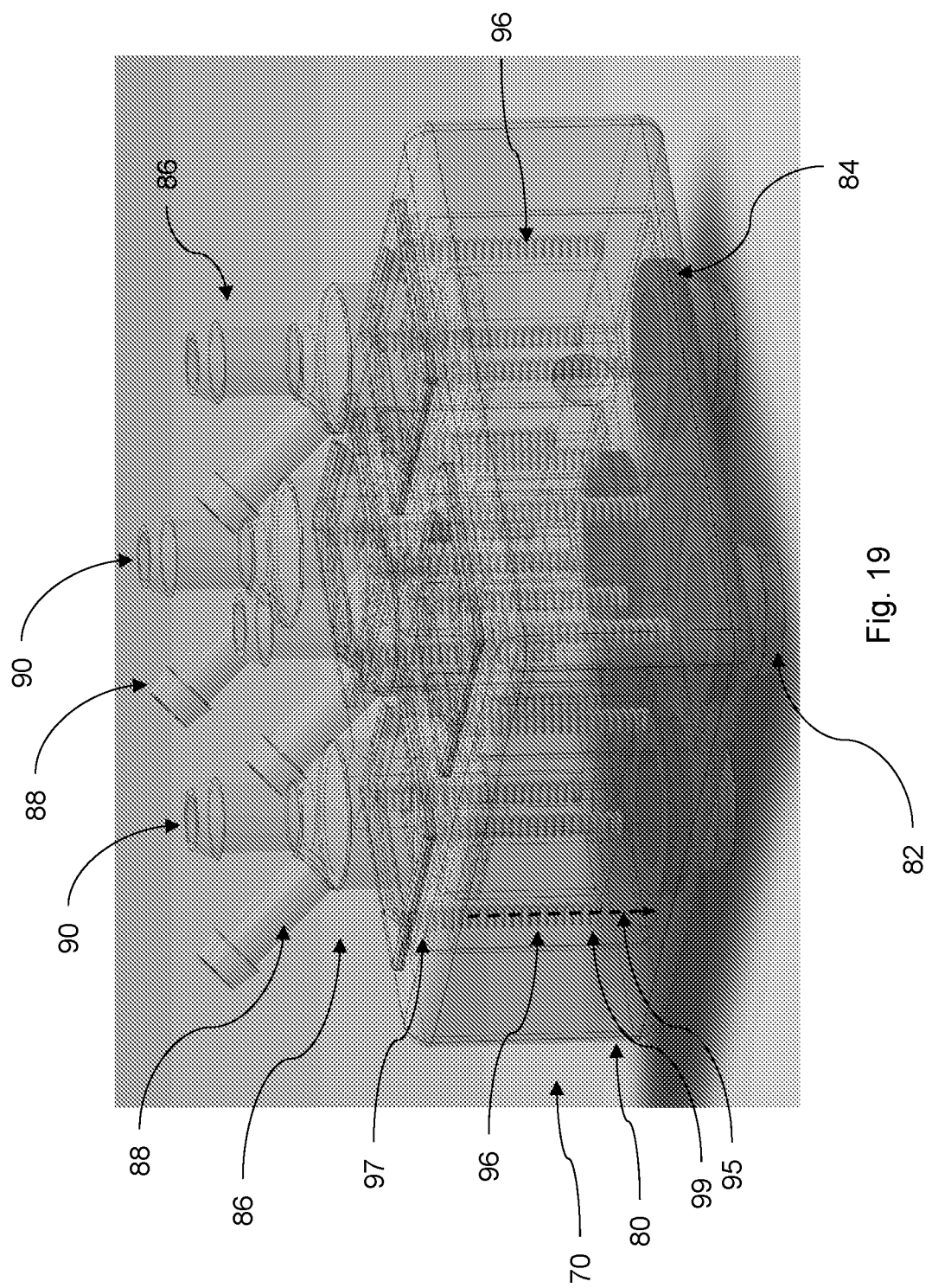
FIG. 19 is a perspective view of the component of FIG. 18.

The manifold 70 and body member 80 are shown as transparent features in FIGS. 18-19 for illustrative purposes. Within the body member 80 are a plurality of basing elements 96 enabling "float" of the caps 86. The biasing elements 96 of the embodiment of FIGS. 18-19 comprise coil springs. In the depicted embodiment, four coil springs are provided in communication with each cap 86. The four biasing elements allow for a biased vertical displacement of each cap 86 as well movement and rotation about at least one horizontal axis to properly position the caps 86 with a vial comprising irregularities or that is not vertically aligned (for example). The biasing elements 96 of FIG. 18 extend between a first end 97 and a second end 99. The first ends 97 contact or abut a portion of the body member 80. The second ends 99 contact or abut a surface of the caps 86 such that a downward biasing force 95 is provided on each of the caps 86. As shown in FIG. 17, it is contemplated that the manifold 70 and body member 80 are selectively secured to a fixed object such as a vertical support 72 and benchtop 62. Accordingly, force applied to the body member 80 by the biasing member(s) 96 is opposed by a connection of the device to additional components and the caps 86 are biased or compressed upon a vial or container during use.

FIG. 19 is a perspective view of the manifold 70 of FIG. 18. As shown, four caps 86 and associated components are provided in a 2×2 arrangement. As previously noted, manifolds are contemplated comprising various different numbers and arrangements of caps 86 and connecting structures 82, 84 such that manifolds can accommodate various different numbers of vials and accommodate processing contents thereof.

Figure 20:
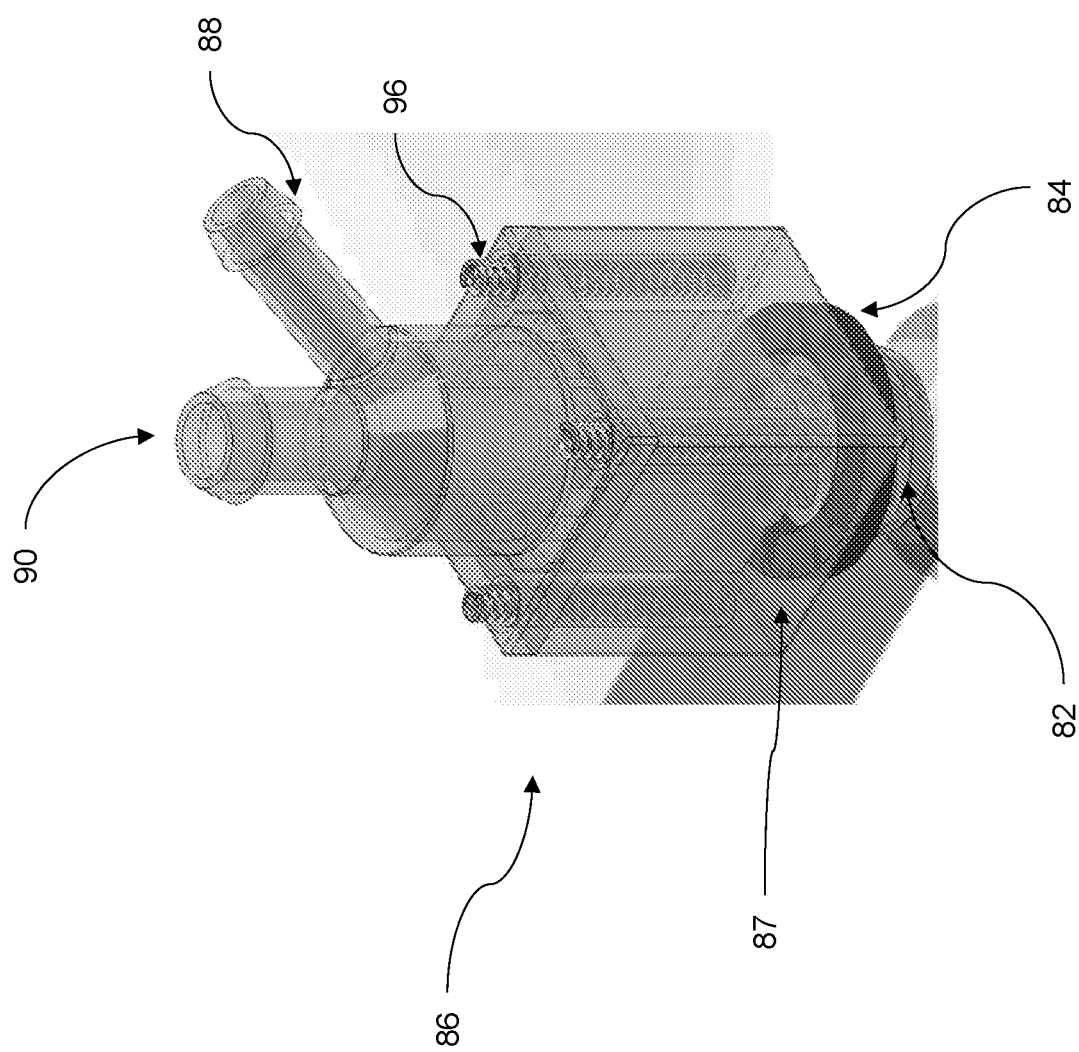
FIG. 20 is a perspective view of a component of a system according to one embodiment of the present disclosure.

FIG. 20 is a perspective view of a cap 86 according to an embodiment of the present disclosure. The cap 86 is intended to be provided within a body portion 80 of a manifold 70 (FIG. 18). The cap 86 of FIG. 20 is contemplated as comprising a displaceable or moveable insert of a manifold assembly 70, for example. As shown, the cap 86 comprises a fluid inlet 88 and a fluid outlet 90. Fluid (e.g. nitrogen gas) is contemplated as being provided through the inlet 88. The injected gas travels through at least one internal conduit, such as a helical conduit, provided through the body 87 of the cap 86. The conduit comprises an outlet provided on the extension 82 of the cap, and the extension 82 and outlet are operable to be provided at least partially within a container and inject gas into the internal volume of the container. A gasket 84 is provided to create a seal around a perimeter of a container opening. A central channel is provided to form a gas outlet 90 from which gas and evaporated contents are exhausted. As shown in FIG. 20, a plurality of biasing elements 96 are provided in communication with the cap 86. Upper ends of the biasing elements 96 are intended to be provided in force transmitting communication with a body member 80 of a manifold and bias the cap 86 downwardly upon a vial to ensure a proper compression force, seal, and fit. In some embodiments, caps are displaceable with respect to a body portion wherein between approximately 1.0 and 20.0 millimeters of travel is provided for each cap 86. In preferred embodiments, caps are displaceable within a manifold and are provided with between about 5.0 and 6.0 millimeters of travel. Biasing elements 96 of the present disclosure are contemplated as comprising various different features including, but not limited to coil springs of different characteristics. In some embodiments, coil springs are provided with a spring force of about 13 pounds per inch. Biasing elements 96 of the present disclosure are contemplated as comprising linearly biased and non-linearly biased elements.

Figure 21:
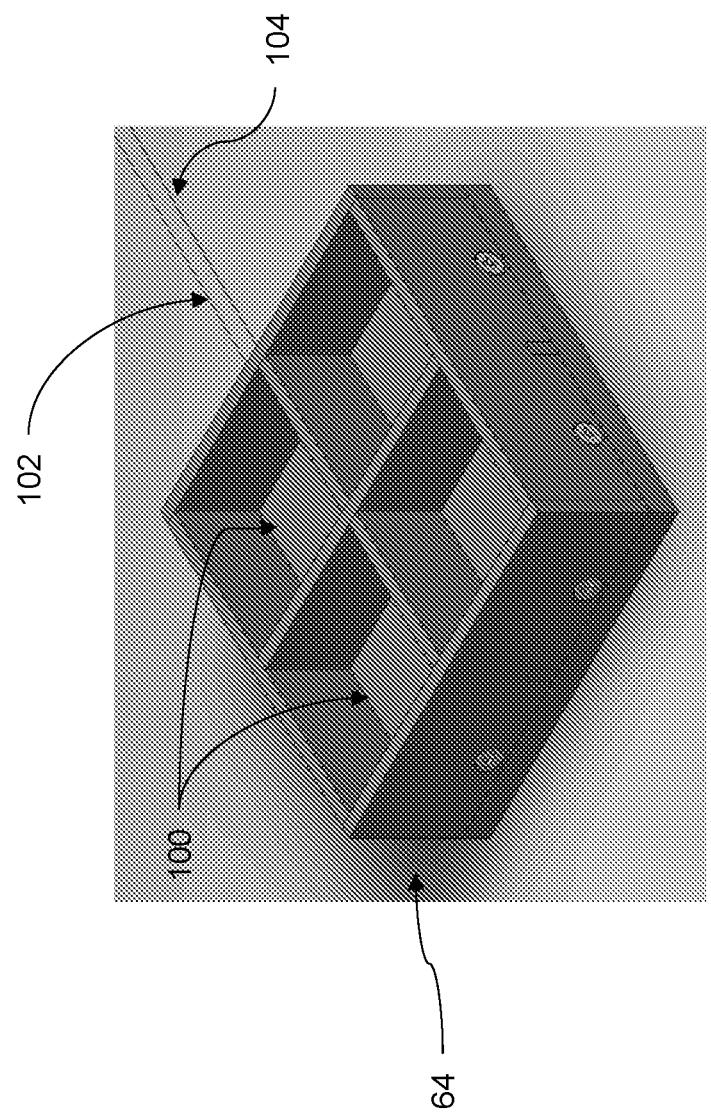
FIG. 21 is a perspective view of a heater block and support structure according to one embodiment of the present disclosure.

FIG. 21 is a perspective view of a heating block 64 according to an embodiment of the present disclosure. The heating block 64 is contemplated as comprising copper and is operable to receive an electrical current and convert electrical power to thermal energy to be provided to vials and fluid contained therein. A plurality of wells 100 are provided within which at least one of silicone inserts and containers can be provided. The block 64 of the embodiment of FIG. 21 is contemplated as comprising a feedback-loop controlled resistance film heater comprising a copper block (for example) to achieve heating goals and stability. Electrical power is contemplated as being provided by a connection 102. A second connection 104 is provided to receive at least one of temperature and a voltage data. The system communicates temperature related data to at least one of a controller and a CPU, which is further operable to control and/or adjust an amount of power provided to the block 64 via the first connection 102. In some embodiments, the block 64 comprises one or more thermocouples operable to convey temperature data to the controller or CPU.

Figure 22:
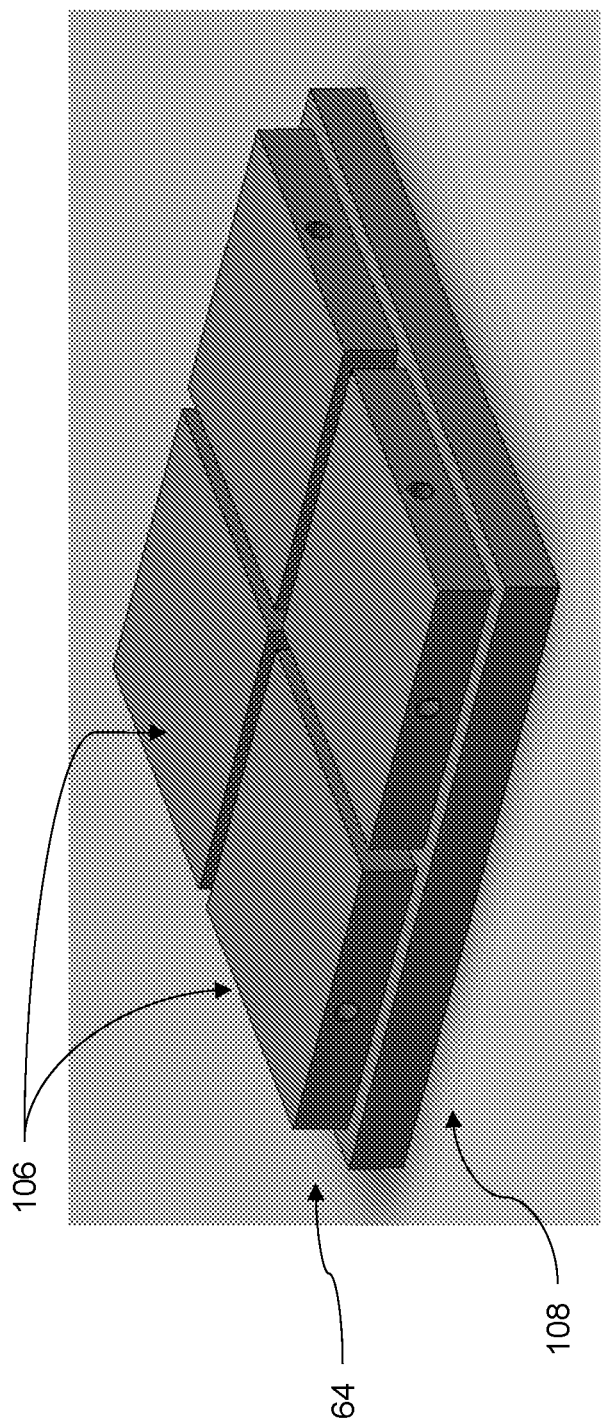
FIG. 22 is a perspective view of a component of a heater block according to one embodiment of the present disclosure.

FIG. 22 is a perspective view of a base member 108 of the heater block 64 of the embodiment of FIG. 21. The base member 108 comprises a four upstanding portions 106, and the base member 108 is operable to receive a plurality of sidewalls (FIG. 21) to create four discrete wells or receiving areas. An interior of the base member 108 is contemplated as comprising a resistance film heater with a resistance grid. A remainder of the base member 108 is contemplated as comprising copper for thermal conductivity. The heater block 64 provides thermal energy to vials or other containers provided within the block or associated silicone inserts. The thermal energy provided to the vials is operable to maintain hardware and fluids within desired temperature ranges to support various processes, ensure desired solubility, etc. Applicant has observed that condensation has occurred during certain processes. The presence of condensation indicates that a fluid temperature has dropped below an acceptable range and introduces water to a setting where it is potentially undesirable. Embodiments of the present disclosure and heater blocks as shown and described herein reduce these risks by maintaining hardware and fluids at desired temperatures.

As one of ordinary skill in the art will recognize, the ASTM flask designations provided here as X/Y refer to standard sizing for flasks wherein X represents the maximum outer diameter of the flask joint in millimeters, and Y represents the length of the flask join in millimeters.

Figure 23:
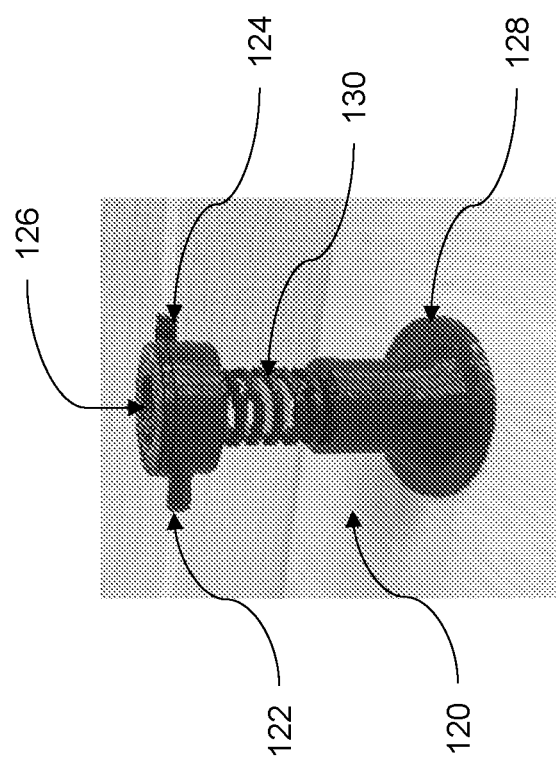
FIG. 23 is a perspective view of an inerting device according to one embodiment of the present disclosure.

FIG. 23 is a perspective view of an inerting device 120 according to one embodiment of the present disclosure. As used herein, an "inerter" or "inerting" device refers to various devices and embodiments that are operable to communicate or convey a quantity of fluid (e.g. inert gas) to a vessel and/or allow for egress of fluid(s) from the vessel. Various embodiments relate to and contemplate devices that are operable sweep, purge, or clear a fluid from a headspace of various vessels and fill or treat the headspace with a fluid that is preferably inert or otherwise preferred for a specific reaction to occur within the vessel. As shown in FIG. 23, the device 120 comprises two inlets 122, 124 provided on an upper portion 126 of the device 120. The device further comprises a base member 128. The inlets 122, 124 comprise fluid inlets that are operable to supply and inject a fluid (e.g. compressed argon gas) to an internal volume of a vessel housed within the device 120. The inlets preferably comprises an angled inlet for providing a gas to the vessel at a shallow angle (e.g. between approximately 1 and 40 degrees and more preferably of about 25 to 35 degrees). In the depicted embodiment, a fluid outlet is provided via the open upper end of the container through which fluid (e.g. gas is allowed to vent). In some embodiment, it is contemplated that one of the depicted inlets may be formatted as a fluid outlet that is operable to evacuate or clear gas(es) from the vessel. For example, the inlet 124 is contemplated as being operable to be provided with a vacuum force and clear or void a headspace of the container. The outlet is contemplated as sweeping or clearing ambient air initially provided within the vessel, clearing fluid(s) provided by the inlet 122, and/or clearing fluid(s) created or formed during a reaction provided within the vessel. In various embodiments, including that shown in FIG. 23, an upper portion 126 of the device comprises an open area. The open area is operable to receive various objects including, for example, solid reagents, instrumentation, robotic instrumentation, and additional fluid conduits. A biasing member 130 is provided to bias the upper portion 126 of the device and facilitate or enable a seal between the device and a vessel provided therein.

Figure 24B:
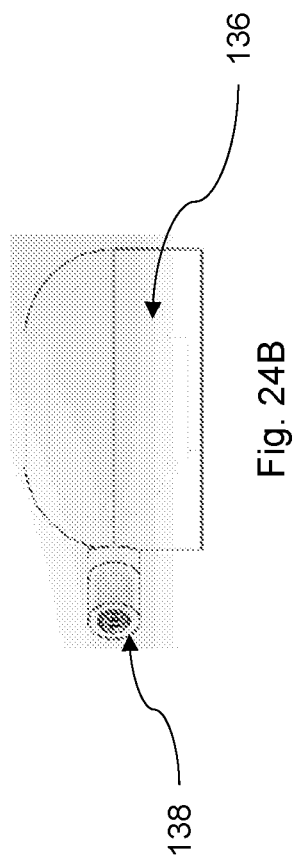
FIG. 24B is an elevation view of a component of the inerting device of the embodiment of FIG. 24A.
Figure 24A:
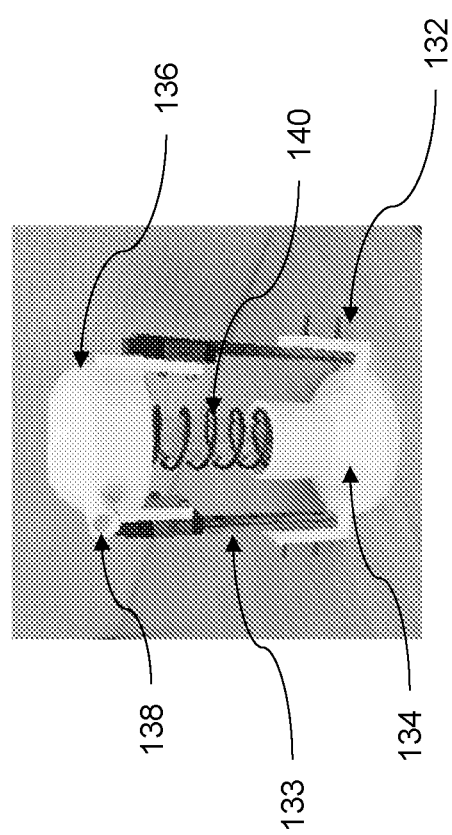
FIG. 24A is a perspective view of an inerting device according to one embodiment of the present disclosure.

FIG. 24A is a perspective view of an inerter device 132 according to another embodiment of the present disclosure. As shown, the device 132 comprises a base member 134 and an upper portion 136. The base member 134 comprises a member that can be placed on various support surfaces (e.g. benchtops) or secured to various equipment. One or more rigid connections 133 are provided that connect and secure the base member 134 and the upper portion 136. A vessel is contemplated as being provided within the device and biased upwardly by a spring or similar biasing member 140. In some embodiments, the biasing member 140 is secured at one end to the base member 134 and biases the vessel upwardly into sealing or partial sealing engagement with the upper portion 136. Various alternative arrangements are contemplated and inerter devices of the present disclosure are not limited to devices that comprise biasing members.

As shown in FIGS. 24A-24B, the inerter device comprises at least one fluid port 138. The fluid port 138 is operable to convey or inject one or more fluids (e.g. inert gas) to an internal volume of the device and any associated vessel. In certain embodiments, fluid injected to the vessel from the fluid port 138 comprises an insertion or injection angle that is of a low or shallow angle relative to horizontal (e.g. 1 to 20 degrees above a horizontal plane). In some embodiments, the system comprises a helical injection conduit (see, for example, FIG. 16A). In some embodiments, it is contemplated that the fluid port 138 comprises a port that is operable for both the insertion and extraction of fluids from a vessel. For example, it is contemplated that the fluid port may be provided with a vacuum force and a conduit to draw or extract fluid from the headspace of a vessel. The same fluid port 138 is contemplated as being provided as an inlet port for the injection or insertion of fluid(s). An upstream valve (not shown in FIG. 24B) is contemplated to enable such operation and/or conduits or tubing may be manual removed and replaced to convert the fluid port 138 between an injection and an extraction port. In further embodiments, a plurality of fluid ports are provided on an upper portion of an inerter device wherein each port is dedicated to an injection or extraction operation.

FIG. 25A and 25B are top perspective views of the inerter device 132 of the embodiment of FIGS. 24A-24C. As shown in detail in FIG. 25B, an upper portion 136 of the device comprises a fluid port 138. The fluid port is shown in FIG. 25B as comprising a threaded female connection for receiving various components, but no limitation with respect to the shape, size, orientation, etc. of the fluid port 138 is provided herewith. As further shown in FIG. 25B, the upper portion 136 comprises an inlet 140. The inlet 140 is contemplated as providing means for ingress of various materials including, for example, solid reagents to be deposited into the system and any associated vessel. As shown in FIG. 25B, the inlet 140 comprises a funnel shape in the form of an inverted frustoconical void. The fluid port 138 extends at an angle through a sidewall of the upper portion 136. A 30 proximal end of the fluid port 138 is provided on an external portion of the device and a distal end of the fluid port 138 terminates at a lower region of the fluid port 138.

FIG. 26A is a front elevation view of an inerter device 150 according to another embodiment of the present disclosure. As shown, the device 150 comprises a support structure 152 including a base portion 153 and an upper portion 156. The upper portion 156 is operable to receive and support a vial 154 in which materials can be housed and reactions may occur. As shown in FIG. 26B, the upper portion 156 comprises a port 158 that is contemplated as being provided in a funnel, conical or frustoconical shape and is operable to receive and allow insertion of objects into the vial 154. For example, solid reagent particles may be automatically or manually inserted into the vial 154 through the port 158. The device 150 comprises a receiving portion or slot 157 for selectively receiving a vial.

FIGS. 26B-26C also show a fluid port 160 operable to at least one of insert and extract fluids from the system. FIGS. 26B shows two inerter devices 152 of different sizes. Devices of different sizes are contemplated to accommodate different sized containers and various different reactions. In some embodiments, the fluid port 160 is contemplated as comprising a gas inlet port for injecting fluid (e.g. argon gas) into the headspace of the vial 154. It is contemplated, for example, that during use the vial comprises a quantity of liquid that occupies less than all of the interior volume of the container 154. Applicant has determined that the headspace (i.e. volume of the container that is not occupied by solid or liquid) may become entrained with ambient air and its constituent oxygen. This ambient air and associated oxygen may have adverse effects on reactions occurring or intended to occur within the container 154. Methods and systems of the present disclosure contemplate providing an inert gas via the fluid port 160 to purge and replace ambient air (for example) with an inert gas that is more desirable for a given reaction. For the purposes of the present disclosure, inert gases include but are not limited to argon, nitrogen, and helium. It will be recognized, however, that various gases may be provided an injected based on the reaction(s) intended to occur within the vial 154. Such gases are intended to provide non-reactive properties and prevent undesirable chemical reactions from taking place within the vial, and various gases and combinations of such gases may be applied by systems and methods of the present disclosure.

Fluids and gases in the headspace may be purged or displaced by the injection of inert gas through the fluid port 160. The displaced fluid(s) are contemplated as being removed or ejected from the vial 154 by way of the port 158. In some embodiments, at least one additional fluid port is provided to allow for the egress of unwanted fluid from the vial 154.

FIGS. 27A-27D are perspective views of an inerter device according to another embodiment of the present disclosure. As shown, the device 170 comprises an upper portion 172 that is operable to receive and support a container or vial 176. The upper portion 172 is shown in isolation in FIG. 27A and comprises at least one fluid port 174, a receiving slot 180 for a vial, and an aperture 182 at an upper end thereof. The device may be secured to various equipment (e.g. laboratory clamps) by a grasping member 173. The grasping member 173 may be grasped by or otherwise secured to various existing benchtop equipment and devices. The receiving slot 180 comprises a receiving and support means for a vial and is intended to support a lip or upper end of a vial (see FIG. 27C, for example).

When inserted, the vial 176 is operable to communicate with at least one of the fluid port 174 and the aperture 182. In operation, the fluid port 174 is operable to selectively inject an insert gas (for example) to a headspace of the vial 176. Ambient air or other undesired fluid can be purged by the injection of insert gas, and the undesired fluid is allowed to escape through the aperture 182 due to the pressure differential created by the injection of fluid from the fluid port 174.

Figure 27A:
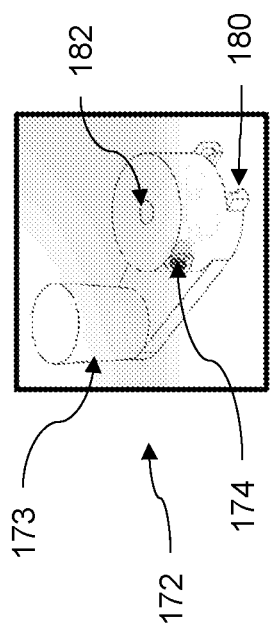
FIG. 27A is a perspective view of a component of an inerting device according to one embodiment of the present disclosure.
Figure 27B:
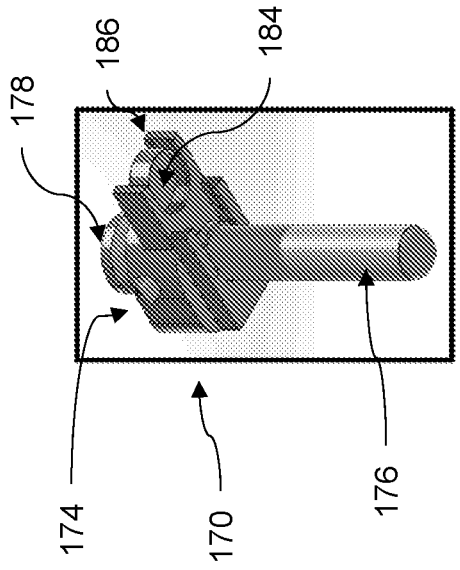
FIG. 27B is a perspective view of an inerting device and vessel according to one embodiment of the present disclosure.
Figure 27C:
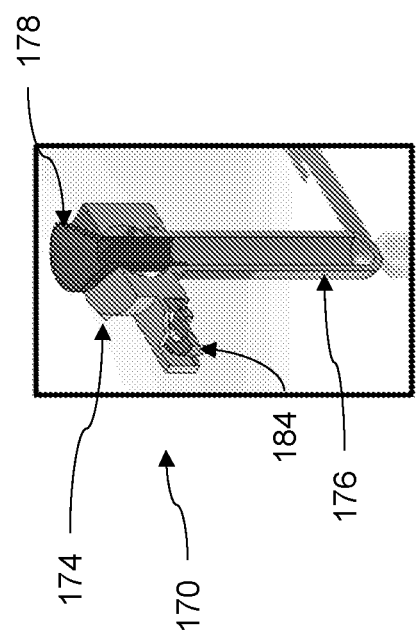
FIG. 27C is a cross-sectional perspective view of the inerting device of the embodiment of FIG. 27B.
Figure 27D:
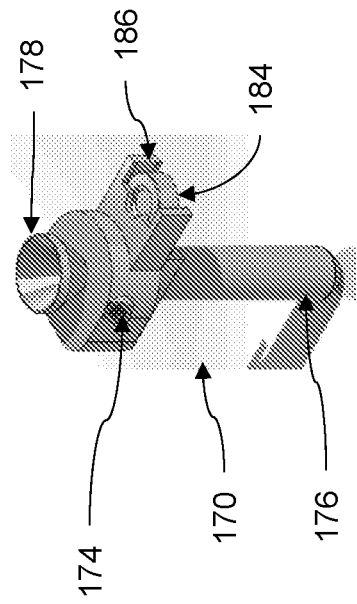
FIG. 27D is a perspective view of the inerting device according to the embodiment of FIG. 27B.

The aperture 182 is contemplated as comprising a means for egress of fluid from a container 176 as well as a means for ingress of certain materials including fluids (gases and liquids) and solids (e.g. solid reagents to be applied to an internal volume of the container 176). As shown in FIGS. 27B-27D, the aperture 182 is provided with a funnel member 178.

The funnel member 178 enables and facilitates insertion of materials including, for example, solid particles. It is further contemplated that the aperture 182 can provided with various different features and components. For example, it is contemplated that the aperture 182 and/or funnel 178 can be selectively fitted with a plug or seal. The aperture 182 is further operable to and contemplated as receiving tubing, conduits, wiring, instrumentation, and/or various other features as required or desired based on a particular reaction or process to occur within the vial 176.

As shown in FIGS. 27B-27D, the device 170 comprises a receiving member 186 for housing a cap or lid 184 for a container 176. Various embodiments of the present disclosure contemplate a system for processing or formulating various solutions and reactions (e.g. pharmaceuticals). It is contemplated that the resulting product in the vial may need to be closed or sealed within a short period of time after a reaction is complete. A cap such as a crimp cap 184 is provided within the receiving member 186 and the cap 184 is quickly deployable. In some embodiments, the vial 176 is threadingly engaged to the upper portion 172 and can be quickly unthreaded and re-threaded with the cap 184. In some embodiments, the vial 176 is firmly slotted to the upper portion 170 and can be quickly capped or uncapped with the cap 184 while slotting the upper portion 172 to or from the device 170.

FIGS. 28A-28C are perspective views of an inerter system according to one embodiment of the present disclosure. As shown, the system 190 comprises a container receiving member 192 that is operable to receive at least one vial 194. In the embodiment of FIGS. 28A-28C, the system 190 is shown as being supported by a clamp 196 that secures a vial 194. The container receiving member 192 comprises a cover member that communicates with the vial 194. Specifically, the container receiving member 192 is provided on an in communication with an open upper end of the vial 194. A fluid port 198 is provided through a sidewall of the container receiving member 192. In preferred embodiments, the fluid port extends through the container receiving member at an angle such that fluid can be injected into the container 192 at a shallow angle that is preferably between approximately 1 and 30 degrees, and more preferably of between about 10 and 25 degrees. The system further comprises an aperture 200 in a top portion of the container receiving member 192. The aperture 200 is operable to allow for access into the vial 194 for instrumentation, insertion of materials and reagents, and additional features (e.g. conduits). It is contemplated that at least one of a plug and a cap is provided for the aperture 200 when sealing is desired.

A vial cap 202 and cap receiver 204 is provided. As shown, the vial cap 202 resides proximal to a vial in which reactions are provided and/or materials are formulated. In some embodiments, the vial cap 202 is securely received within the cap receiver 204 such that the vial 194 can be removed from an initial position and threaded into the cap 202 without further securing or grasping of the cap 202.

FIG. 29A is a perspective view of an inerter system 190 as shown in FIG. 28A. The system of FIG. 29A further comprises an oxygen sensor 206 that is shown as extending through the aperture 200 and into a liquid component provided within the vial 194.

FIG. 29B is a plot showing the oxygen concentration with the liquid and as measured by the oxygen sensor 206 of FIG. 29A. The oxygen concentration of the liquid is initially provided at approximately 20% (i.e. the maximum oxygen saturation of a liquid exposed to ambient air for a certain period of time). At t=0 in FIG. 29B, sweeping or clearing of the headspace in the vial is initiated by providing a flow of inert gas through the fluid port 198. As shown, significant reduction in oxygen concentration begins to occur at approximately 10 seconds. Between approximately 10 and 15 seconds, oxygen concentration is reduced to well below 5% and more preferably below approximately 1%. Systems and methods of the present disclosure thus provide an effective, reliable and rapid reduction of oxygen (for example) from a container.

Figure 30A:
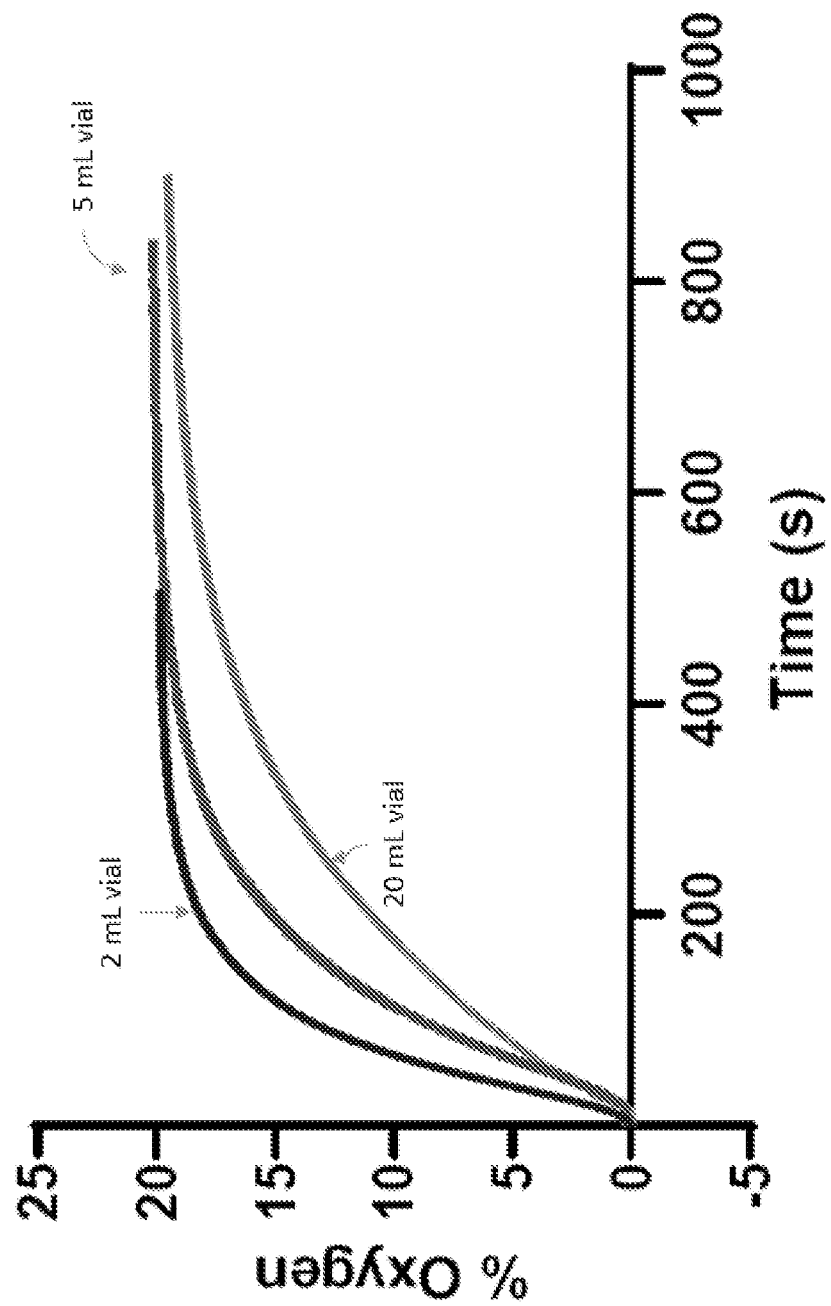
FIG. 30A is a plot showing oxygen concentration in different vessels over time.
Figure 30B:
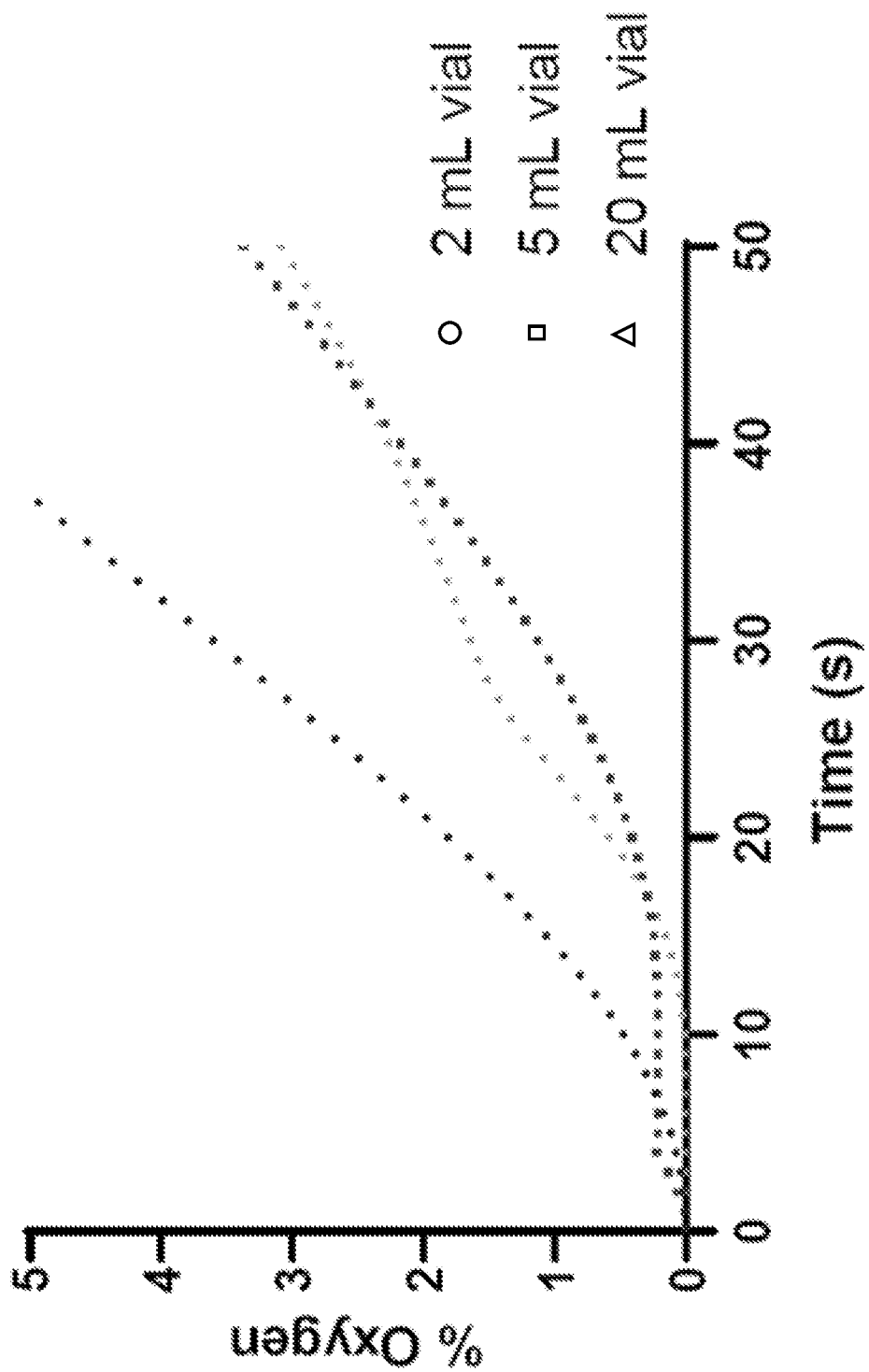
FIG. 30B is a plot showing oxygen concentration in different vessels over time.

FIG. 30A is a plot showing oxygen concentration in various containers over time. FIGS. 30A-30B show containers that have been initially purged or voided of oxygen through various known methods as will be recognized by one of ordinary skill in the art. FIG. 30A illustrates the increase and saturation of an internal volume of a container with ambient air over time. As shown, containers of various volumes (e.g. 2 mL, 5 mL, and 20 mL) are initially provided as having been swept or purged of oxygen. For example, the containers may be purged with an inert gas as shown and described with respect to FIGS. 29A-29B such that the oxygen concentration in the container(s) is approximately zero percent by volume. When exposed to ambient air, the containers will approach a limit of oxygen concentration wherein each limit is approximately 20% (i.e. approximately the concentration of oxygen in ambient air of 21% at typical conditions). For smaller containers (e.g. 5 mL or smaller), this limit is reached within approximately 400 seconds. For larger containers (e.g. 20 mL containers and larger), a similar limit will be approached and full oxygen concentration will be reached at approximately 800-1,000 seconds.

FIG. 30B is a detailed view of the increase in oxygen concentration for various containers as shown in FIG. 30A. FIG. 30B shows the increases in oxygen concentration within the first fifty seconds of exposure to ambient air. As shown, the rate of change of oxygen concentration is relatively minor for the initial ten to twenty seconds for larger containers (e.g. 5 mL and 20 mL containers). Smaller containers (e.g. 2 mL containers) show a similar response but over a shorter period of time (between about two to five seconds). Within approximately thirty to forty seconds, the oxygen concentration in the containers reaches a somewhat linear and rapid increase until an inflection point (FIG. 30A) is reached and the oxygen concentration begin to approach a known limit.

Figures 31A, 31B:
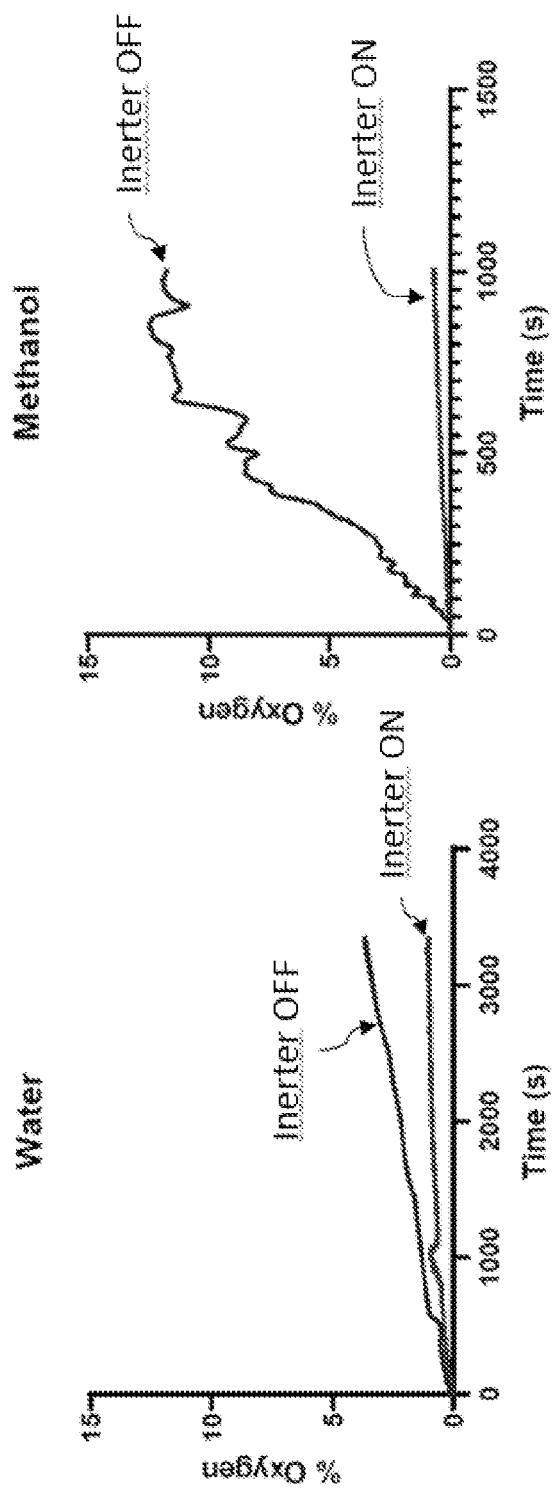
FIG. 31A is a plot showing oxygen concentration in water over time.
FIG. 31B is a plot showing oxygen concentration in methanol over time.

FIG. 31A is a plot showing the oxygen concentration in water over time. Two plot lines are provided. A first plot line illustrates an oxygen concentration in water over time with no inerter system provided or with an inerter system provided in an off position. As shown, the oxygen concentration for both data sets is initially provided at approximately zero percent (at t=0 s). Over time and as the water is exposed to ambient air, the oxygen concentration is known to increase as oxygen from ambient air is dissolved into the water. Without the provision of inerter systems and methods of the present disclosure, oxygen concentration increases at a higher rate and approaches approximately five percent within approximately 53 minutes (3,200 seconds). In contrast and as also shown in FIG. 31A, the increase in oxygen concentration in water is significantly reduced when inerter systems of the present disclosure are employed. While some increase in oxygen concentration is detected in water, it is significantly reduced relative to conditions without inerter systems and methods. As shown, the oxygen concentration in water is maintained at or below two percent over the same time period (i.e. approximately 3,200 seconds).

FIG. 31B is a plot showing the oxygen concentration in methanol over time. Two plot lines are provided. A first plot line illustrates an oxygen concentration in methanol over time with no inerter system provided or with an inerter system provided in an off position. As shown, the oxygen concentration for both data sets are initially provided at approximately zero percent (at t=0 s). Over time and as the methanol is exposed to ambient air, the oxygen concentration is known to increase as oxygen from ambient air is dissolved into the methanol. Without the provision of inerter systems and methods of the present disclosure, oxygen concentration increases at a higher rate and approaches values greater than approximately ten percent within approximately 1,000 seconds (approximately 17 minutes). Prior to purging methanol through one or more known methods to reduce the oxygen concentration to approximately 0%, it is known that the ambient concentration of oxygen in methanol is approximately 14-14.5%. Without the use of inerter systems of the present disclosure, and as shown in FIG. 31B, the oxygen concentration in methanol exceeds 10% and begins to approach the ambient level (approximately 14%) within approximately 700 seconds or 12 minutes. At a time of approximately 1,000 seconds, FIG. 31B shows that the oxygen concentration in methanol approaches a limit generally corresponding to the ambient concentration of oxygen in methanol.

In contrast and as also shown in FIG. 31B, the increase in oxygen concentration in methanol is significantly reduced when inerter systems of the present disclosure are employed. While some increase in oxygen concentration is detected in methanol, it is significantly reduced relative to conditions without inerter systems and methods. As shown, the oxygen concentration in methanol is maintained at or below two percent and preferably below one percent for at least approximately 17 minutes. FIGS. 31A-31B illustrate the significant benefits provided by inerter systems and methods of present disclosure and wherein oxygen and oxygen concentration can be controlled and limited in a container and/or fluid thereby enabling reactions to occur within the vial without complications provided by oxygen present (for example).

Figure 32:
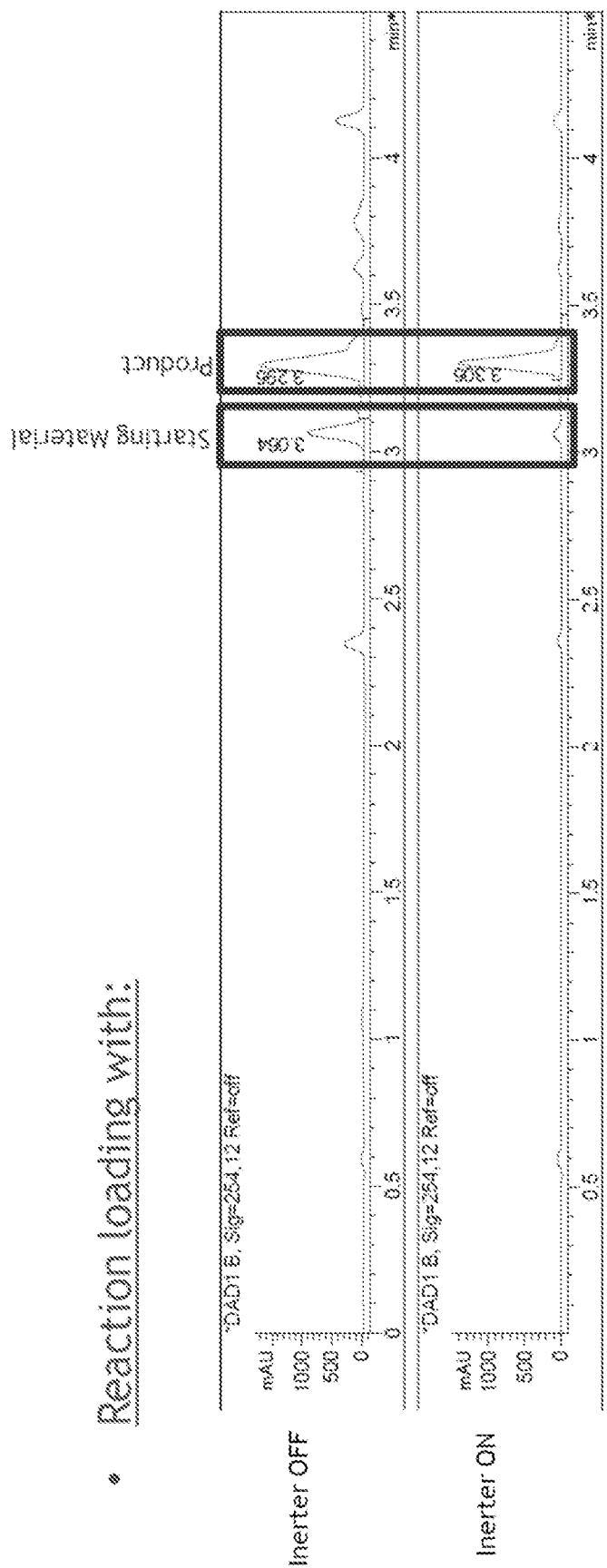
FIG. 32 is a plot of two different reactions as produced by methods and systems of the present disclosure.

FIG. 32 illustrates a chromatographic analysis of two reactions under two different conditions. One condition represents a lack of inerter features (Inerter OFF) and systems while the second condition is characterized by having an inerter system provided and active (Inerter ON). As shown, inerter systems, methods and features of the present disclosure provide for an enhanced system with higher yields. The analysis and reaction under the "Inerter ON" conditions indicates that nearly all starting material is consumed, whereas the "Inerter OFF" conditions indicate significantly more starting material remaining. As shown in FIG. 32, the inerting features, methods and systems of the present disclosure provide for more efficient reactions by controlling the oxygen levels (for example) within a container in which the reaction occurs.

In various embodiments, methods of managing fluid flow and fluid concentration within a container or vessel are provided. In some embodiments, methods of the present disclosure contemplate selectively modifying a composition of a container's fluid contents including but not limited oxygen content and concentration and performing associated reactions and processes. In some embodiments, methods are provided wherein a system of the present disclosure is provided with a container. The container is provided with a fluid (e.g. water or another liquid) that occupies less than entirety of the container's volume. A headspace is provided that initially comprises a quantity of ambient air in a space above the liquid. A flow of inert gas is provided to the headspace. The flow of inert gas is preferably provided until oxygen (or similar) is purged from the container. The flow of inert gas may be provided for a predetermined amount of time and/or the gas may be provided until a sensor determines that oxygen concentration is below a desired value. Upon the oxygen concentration reaching a desired condition or level, further process steps are performed. For example, solid reagents, additional liquids, thermal energy, etc. may be applied to the liquid based on the reaction and process desired. The flow of inert gas may be selectively terminated and/or may be automatically cycled on and off based on a detected oxygen concentration level until the process is complete.

Various embodiments of the present disclosure contemplate automation of various methods and method steps disclosed herein. For example, in some embodiments, it is contemplated that the provision of an inert gas in inerter systems of the present disclosure is automated or at least partially automated. In some embodiments, a sensor (e.g. oxygen sensor) is provided. The sensor continuously monitors for a condition (oxygen concentration, for example). Information and data from the sensor is tracked, monitored, stored, etc. by a controller or central processing unit. The information is used, for example, to maintain or terminate the flow of inert gas and/or automatically insert or apply additional elements (e.g. solid particles for a reaction). Such systems are contemplated as continuously monitoring oxygen concentration, initiating inert gas flow when the oxygen concentration is above a predetermined value and/or terminating inert gas flow when the oxygen concentration is below a second predetermined value. For example, the oxygen concentration in a fluid is contemplated as being maintained within a given range (e.g. 0.5%-3.0%) by automated systems, methods and features of the present disclosure. Such systems reduce user input and provide an additional benefit of inert gas conservation and efficiency.

In some embodiments, automated systems comprises one or more automated actuators, arms, or servo-motors to perform certain automated tasks. For example, it is contemplated that a motorized or arm or linkage is provided to supply or deliver reagents to a system. The motorized component is contemplated as being automatically activated by a condition being met (e.g. an oxygen concentration being below a predetermined value). Such features are also contemplated as performing alternative or additional tasks including, for example, sealing a container or system, applying a vial cap, and performing similar tasks.

At least controller is provided to receive information related to at least one of oxygen concentration readings and elapsed time. The controller is further operable to output signals to regulate fluid (e.g. inert gas) flow and control automated processes.

It is to be understood that the disclosure is not limited to particular methods or systems, which can, of course, vary. It is also to be understood that the terminology used herein is for the purpose of describing particular embodiments only and is not intended to be limiting.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. An apparatus operable for use in evaporating solvent from a container, the apparatus comprising:
   a closure member comprising an upper portion and an extension;
   the upper portion comprising an inlet provided at an angle relative to a longitudinal axis of the closure member;
   the extension operable to extend into an internal volume of a container, and wherein the extension comprises a gas port for ejecting fluid provided to the inlet into the container;
   an internal helical conduit extending within the extension that is operable to convey gas between the inlet and the gas port;
   an exit channel extending through the closure member; and
   wherein closure member comprises an annular sealing element.

2. The apparatus of claim 1, further comprising a gas delivery line connected to the inlet.

3. The apparatus of claim 1, wherein the exit channel comprises an exit port on the upper portion of the closure member.

4. The apparatus of claim 3, wherein the exit channel comprises a threaded connection.

5. The apparatus of claim 1, further comprising a vacuum line in fluid communication with the exit channel.

6. The apparatus of claim 1, wherein the angle comprises an angle between 10 and 80 degrees.

7. The apparatus of claim 1, wherein the apparatus comprises first, second, and third helical conduits.

8. A system operable for use in evaporating solvent from a container, the system comprising:
   a plurality of cover members each comprising a gas inlet and a gas outlet;
   an extension operable to extend into an internal volume of a container, and wherein the extension comprises a gas port for ejecting fluid provided to the inlet;
   the gas outlet comprising an exit channel extending through each of the plurality of cover members;
   an annular sealing element;

wherein each of the plurality of cover members are provided within a body member, and wherein the body member is secured to and adjustable relative to a support member; and wherein each of the plurality of cover members comprise at least one biasing member in force transmitting communication with the body member, wherein the biasing member is operable to bias a first portion of each of the plurality of cover members relative to a second portion of each of the plurality of cover members and thereby facilitate a seal between the cover members and a respective container.

9. The system of claim 8, wherein the gas inlet is in fluid communication with a helical conduit extending internally within the cover member.

10. The system of claim 8, further comprising a gas delivery line connected to at least one of the gas inlets.

11. The apparatus of claim 8, wherein the exit channel comprises an exit port.

12. The apparatus of claim 11, wherein the exit port comprises a threaded connection.

13. The apparatus of claim 8, further comprising a vacuum line in fluid communication with the exit channel.

14. The apparatus of claim 8, wherein the gas inlet is provided at an angle that comprises an angle between 10 and 80 degrees.

15. The system of claim 8, wherein the biasing member comprises a coil spring.

16. The system of claim 8, wherein the first portion comprises an upper portion of each of the plurality of cover members.

17. The system of claim 8, wherein the second portion comprises a sealing portion of each of the plurality of cover members.

18. The apparatus of claim 7, wherein each of the first, second, and third helical conduits each comprises a dedicated outlet.

* * * * *